United States Patent
Lim et al.

(10) Patent No.: US 10,244,252 B2
(45) Date of Patent: Mar. 26, 2019

(54) METHOD AND APPARATUS FOR ENCODING/DECODING IMAGES USING A MOTION VECTOR

(75) Inventors: Sung Chang Lim, Daejeon-si (KR); Hui Yong Kim, Daejeon-si (KR); Se Yoon Jeong, Daejeon-si (KR); Suk Hee Cho, Daejeon-si (KR); Dong San Jun, Daejeon-si (KR); Jong Ho Kim, Daejeon-si (KR); Ha Hyun Lee, Seoul (KR); Jin Ho Lee, Daejeon-si (KR); Jin Soo Choi, Daejeon-si (KR); Jin Woong Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 370 days.

(21) Appl. No.: 13/979,214

(22) PCT Filed: Jan. 31, 2012

(86) PCT No.: PCT/KR2012/000770
§ 371 (c)(1),
(2), (4) Date: Jul. 11, 2013

(87) PCT Pub. No.: WO2012/105807
PCT Pub. Date: Aug. 9, 2012

(65) Prior Publication Data
US 2013/0294522 A1    Nov. 7, 2013

(30) Foreign Application Priority Data

Jan. 31, 2011 (KR) .................. 10-2011-0009636
Mar. 3, 2011 (KR) .................. 10-2011-0019166
(Continued)

(51) Int. Cl.
H04N 19/513    (2014.01)
H04N 19/61    (2014.01)
(Continued)

(52) U.S. Cl.
CPC ......... *H04N 19/513* (2014.11); *H04N 19/426* (2014.11); *H04N 19/44* (2014.11); *H04N 19/61* (2014.11)

(58) Field of Classification Search
CPC ........... H04N 19/00733; H04N 19/426; H04N 19/44; H04N 19/513; H04N 19/61
(Continued)

(56) References Cited

U.S. PATENT DOCUMENTS 5,262,854 A    11/1993    Ng
6,389,071 B1    5/2002    Wilson
(Continued)

FOREIGN PATENT DOCUMENTS

CN    1154344 C    6/2004
CN    101090499 A    12/2007
(Continued)

OTHER PUBLICATIONS

Ji et al. "New Scaling Technique for Direct Mode Coding in B Pictures" Institue of Computing Technology, 2004.*
(Continued)

*Primary Examiner* — Jamie J Atala
*Assistant Examiner* — James T Boylan
(74) *Attorney, Agent, or Firm* — Wong & Rees LLP

(57) ABSTRACT

The present invention relates to a method and apparatus for encoding/decoding image using a motion vector.According to one embodiment of the present invention, an image-decoding method is provided. The image-decoding method comprises the following steps: clipping a motion vector of a reference picture with a predetermined dynamic range so as to generate a clipped motion vector; storing the clipped motion vector in a buffer; deriving a motion vector of a block to be decoded using the motion vector stored in the buffer; and performing inter-prediction decoding using the
(Continued)

motion vector of the block to be decoded. According to the present invention, the size of a memory space required to store a motion vector may be reduced.

7 Claims, 15 Drawing Sheets

(30) Foreign Application Priority Data

| May 27, 2011 | (KR) | .......................... 10-2011-0050853 |
| Jul. 1, 2011 | (KR) | .......................... 10-2011-0065707 |
| Jan. 31, 2012 | (KR) | .......................... 10-2012-0010096 |

(51) Int. Cl.
*H04N 19/44* (2014.01)
*H04N 19/426* (2014.01)

(58) Field of Classification Search
USPC ..................................................... 375/240.16
See application file for complete search history.

(56) References Cited

U.S. PATENT DOCUMENTS

| 8,064,521 | B2 | 11/2011 | Maeda | |
| 8,837,605 | B2 | 9/2014 | Heng et al. | |
| 2002/0080874 | A1 | 6/2002 | Wilson | |
| 2003/0133512 | A1* | 7/2003 | Moni | H04N 19/176 375/246 |
| 2003/0174776 | A1* | 9/2003 | Shimizu | H04N 19/52 375/240.16 |
| 2004/0057521 | A1 | 3/2004 | Brown et al. | |
| 2004/0105589 | A1 | 6/2004 | Kawaharada et al. | |
| 2004/0234143 | A1* | 11/2004 | Hagai | H04N 19/105 382/238 |
| 2005/0013372 | A1* | 1/2005 | Srinivasan | H04N 19/513 375/240.16 |
| 2006/0133486 | A1* | 6/2006 | Boyce | H04N 19/577 375/240.12 |
| 2007/0014359 | A1* | 1/2007 | Gomila | H04N 19/51 375/240.16 |
| 2007/0237232 | A1 | 10/2007 | Chang et al. | |
| 2012/0134415 | A1* | 5/2012 | Lin | H04N 19/52 375/240.16 |
| 2013/0128976 | A1* | 5/2013 | Koyama | H04N 19/513 375/240.16 |
| 2016/0212442 | A1* | 7/2016 | Hallapuro | H04N 19/52 |

FOREIGN PATENT DOCUMENTS

| CN | 101379829 A | 3/2009 |
| CN | 101841712 A | 9/2010 |
| JP | 11088888 A | 3/1999 |
| JP | H11-122624 A | 4/1999 |
| JP | 2005-533468 A | 11/2005 |
| JP | 2009-533901 A | 9/2009 |
| JP | 2011-10197 A | 1/2011 |
| KR | 10-2004-0016856 A | 2/2004 |
| KR | 10-2004-0035777 A | 4/2004 |
| KR | 10-2005-0026484 A | 3/2005 |
| KR | 10-2008-0070976 A | 8/2008 |
| KR | 10-2011-0017302 A | 2/2011 |
| RU | 2 106 759 C1 | 3/1998 |
| RU | 2 335 859 C2 | 10/2008 |
| WO | WO 2004/008734 A2 | 1/2004 |
| WO | WO 2007/117711 A2 | 10/2007 |

OTHER PUBLICATIONS

Yeping Su et al : "CE9: Reduced resolution storage of motion vector data", 4, JCT-VC Meeting, Jan. 16, 2011, Abstract, Sections 1-3.*
"Text of ISO/IEC 14496-2 (MPEG-4 Visual) 2001 Edition", 57, MPEG Meeting; Sydney; (Motion Picture Expert Group or ISO/IEC JTC1/SC29/WG11), No. N4350, Jul. 30, 2011, Section 7.8.7.3.*
ISO/IEC 14496-2:2001. "Text of ISO/IEC 14496-2:2001, No. N4350 (Unifying N2502, N3056, and N3664)" *MPEG-4 Visual 2001 Edition, 57.MPEG Meeting* Jul. 16, 2001-Jul. 20, 2001; Sydney; XP030011964, ISSN: 0000-0369: Jul. 2001. (pp. ii-520 in English).
Sullivan, Gary: "Report of Awaji JVT Sixth Meeting". *JVT Meeting MPEG Meeting 2012*; Awaji, Japan; (Joint Video Team of ISO/IEC JTC1/SC29/WG11 and ITU-T SG.16) Dec. 13, 2002. ( pp. 1-37 in English).
Su, Yeping, and Andrew Segall. "CE9: Reduced Resolution Storage of Motion Vector Data." *JCT-VC 4th Meeting, JCTVC-D072*, Daegu, Korea. 2011. http://wftp3.itu.int/av-arch/jctvc-site, Jan. 16, 2011. ( 3 pages in English).
Extended European Search Report issued by the European Patent Office dated Dec. 19, 2014 for corresponding European Application No. 12742304.4 ( 9 pages in English).
Korean Notice of Allowance dated May 2, 2014 in counterpart Korean Application No. KR-10-2012-0010096 (6 pages, in Korean).
Lim, Sung-Chang, et al. "Dynamic range restriction of temporal motion vector" Joint Collaborative Team on Video Coding (JCT-VC) of ITU-T SG16 WP3 and ISO/IEC JTC1/SC29/WG11 5th Meeting: Geneva, CH, Mar. 2011, [JCTVC-E142] (7 pages).
International Search Report dated Sep. 24, 2012 in counterpart International Application No. PCT/KR2012/000770 (4 pages, in Korean, including complete English translation).
Japanese Office Action dated Aug. 14, 2015 for corresponding Japanese Application No. 2013-55191 (2 pages, in Japanese).
Russian Notice of Allowance dated Mar. 1, 2016 in counterpart Russian Application No. 2013140464/08 (3 pages in English, 6 pages in Russian).
Chinese Office Action dated Apr. 1, 2016 in counterpart Chinese Application No. 201280015709.8 (9 pages in English, 9 pages in Chinese).
Korean Office Action dated Sep. 23, 2013 in counterpart Korean Application KR 10-2012-0010096. (4 pages, in Korean).

* cited by examiner

METHOD AND APPARATUS FOR ENCODING/DECODING IMAGES USING A MOTION VECTOR

CROSS-REFERENCE TO RELATED APPLICATIONS

This application is a U.S. national stage application of International Application No. PCT/KR2012/000770 filed on Jan. 31, 2012, which claims the benefit of Korean Patent Application Nos. 10-2011-0009636 filed on Jan. 31, 2011, 10-2011-0019166 filed on Mar. 3, 2011, 10-2011-0050853 filed on May 27, 2011, 10-2011-0065707 filed on Jul. 1, 2011, and 10-2012-0010096 filed on Jan. 31, 2012, in the Korean Intellectual Property Office.

TECHNICAL FIELD

The present invention relates to image processing, and more particularly, to a video coding/decoding method using a clipped motion vector and an apparatus thereof.

BACKGROUND ART

Recently, in accordance with the expansion of a broadcasting system supporting high definition (HD) resolution in the country and around the world, many users have been accustomed to a high resolution and definition image, such that many organizations have conducted many attempts to develop the next-generation video devices. In addition, as the interest in HDTV and ultra high definition (UHD) having a resolution four times higher than that of HDTV has increased, a compression technology for a higher-resolution and higher-definition video has been demanded.

For image compression, an inter prediction technology of predicting pixel values included in a current picture from a picture before and/or after the current picture, an intra prediction technology of predicting pixel values using pixel information in the picture, an entropy coding technology of allocating a short code to a symbol having a high appearance frequency and a long code to a symbol having a low appearance frequency, or the like, may be used.

DISCLOSURE

Technical Problem

The prevent invention provides a video coding/decoding method using a clipped motion vector and an apparatus thereof.

The present invention also provides a method for clipping a motion vector of a reference picture.

The present invention also provides a method for transmitting information on a motion vector.

Technical Solution

In accordance with an illustrative configuration, there is provided an image decoding apparatus. The apparatus includes a reference picture buffer for storing a reference picture; an a motion compensating unit for generating a prediction block using the reference picture and a motion vector of the reference picture. The motion vector of the reference picture is clipped in a predetermined range.

In addition, the motion vector of the reference picture is magnitude scaled and is clipped in the range. The motion vector is clipped in a predetermined fixed value range.

The motion vector of the reference picture is stored in a predetermined block unit. The motion compensating unit generates the prediction block using the motion vector of the reference picture stored in the predetermined block unit.

In one example, X and Y components of the motion vector are clipped in the same fixed value range. The motion vector is a motion vector of a block decoded in an inter-prediction mode.

In accordance with an illustrative configuration, there is provided an image decoding method. The method includes clipping a motion vector of a reference picture in a predetermined range to generate a clipped motion vector; deriving a motion vector of a block to be decoded using the motion vector; and performing inter-prediction decoding using the motion vector of the block to be decoded.

The method also includes magnitude scaling the motion vector of the reference picture. The motion vector of the magnitude scaled reference picture is clipped in the range. The motion vector is clipped in a predetermined fixed value range.

The motion vector of the reference picture is stored in a predetermined block unit, and, in deriving the motion vector, the motion vector of the reference picture stored in the predetermined block unit is derived.

In addition, X and Y components of the motion vector are clipped in the same fixed value range. The motion vector is a motion vector of a block decoded in an inter-prediction mode.

In accordance with an illustrative configuration, there is provided an image encoding apparatus. The apparatus includes a reference picture buffer for storing a reference picture; and a motion compensating unit for generating a prediction blocking using the reference picture and a motion vector of the reference picture. The motion vector of the preference picture is clipped in a predetermined range.

The motion vector of the reference picture is magnitude scale and is clipped in the range. The motion vector is clipped in a predetermined fixed value range. The motion vector of the reference picture is stored in a predetermined block unit, and the motion compensating unit generates the prediction block using the motion vector of the reference picture stored in the predetermined block unit.

In addition, X and Y components of the motion vector are clipped in the same fixed value range. The motion vector is a motion vector of a block encoded in an inter-prediction mode.

Advantageous Effects

According to the exemplary embodiment of the present invention, the video may be coded using the clipped motion vector.

According to the exemplary embodiment of the present invention, a size of a memory required for storing motion vectors may be reduced.

According to the exemplary embodiment of the present invention, a memory access bandwidth required for fetching data from the memory may be reduced.

MODE FOR INVENTION

Hereinafter, exemplary embodiments of the present invention will be described in detail with reference to the accompanying drawings. However, in describing exemplary embodiments of the present invention, well-known functions or constructions will not be described in detail since they may unnecessarily obscure the understanding of the present invention.

It is to be understood that when any element is referred to as being "connected to" or "coupled to" another element, it may be connected directly to or coupled directly to another element or be connected to or coupled to another element, having the other element intervening therebetween. Further, in the present specification, in the case of describing "including" a specific component, it is to be understood that additional components other than a corresponding component are not excluded, but may be included in exemplary embodiments or the technical scope of the present invention.

Terms used in the specification, 'first', 'second', etc., may be used to describe various components, but the components are not to be construed as being limited to the terms. That is, the terms are used to distinguish one component from another component. For example, the 'first' component may be named the 'second' component, and vice versa, without departing from the scope of the present invention.

In addition, components described in exemplary embodiments of the present invention are independently shown only in order to indicate that they perform different characteristic functions. Therefore, the components that are independently shown do not mean that each of the components may not be implemented as one hardware or software. That is, each of the components is divided for convenience of explanation, a plurality of components may be combined with each other to thereby be operated as one component or one component may be divided into a plurality components to thereby be operated as the plurality of components, which are included in the scope of the present invention as long as it departs from essential characteristics of the present invention.

In addition, some of components may not be indispensable components performing essential functions of the present invention, but be selective components improving only performance thereof. The present invention may also be implemented only by a structure including the indispensible components except for the selective components, and the structure including only the indispensible components is also included in the scope of the present invention.

Figure 1:
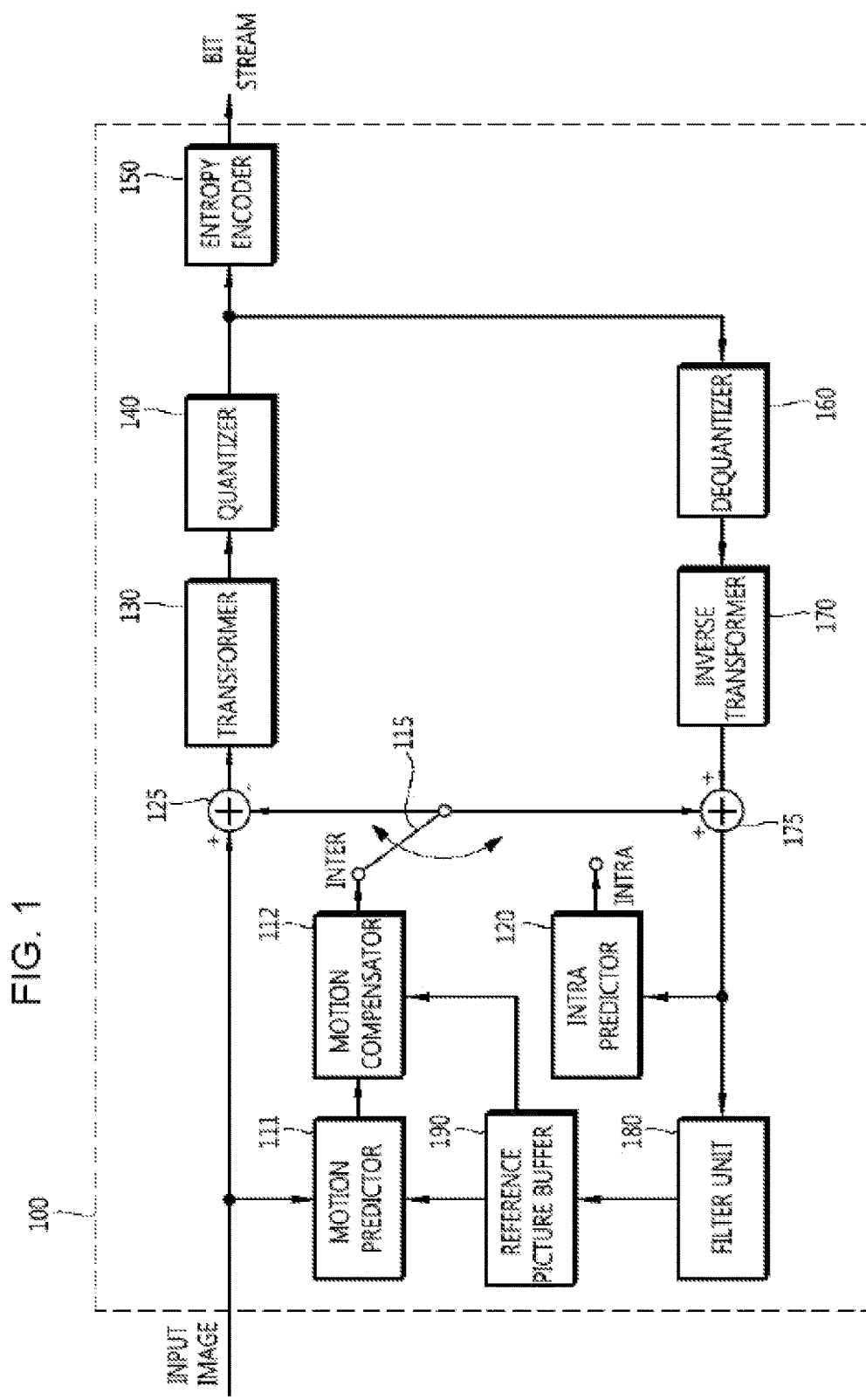
FIG. 1 is a block diagram showing an example of a structure of an encoder according to an exemplary embodiment of the present invention.

FIG. 1 is a block diagram showing an example of a structure of an encoder according to an exemplary embodiment of the present invention.

Referring to FIG. 1, the encoder 100 includes a motion predictor 111, a motion compensator 112, an intra predictor 120, a switch 115, a subtracter 125, a transformer 130, a quantizer 140, an entropy encoder 150, a dequantizer 160, an inverse transformer 170, an adder 175, a filter unit 180, and a reference picture buffer 190.

The encoder 100 encodes input images in an intra prediction mode or an inter prediction mode to encoder output a bitstream. The intra prediction means intra-picture prediction and the inter prediction means inter-picture prediction. The encoder 100 is switched between the intra prediction mode and the inter prediction mode through switching of the switch 115. The encoder 100 generates a predicted block for an input block of the input image and then encodes a residual between the input block and the predicted block.

In the case of the intra prediction mode, the intra predictor 120 performs spatial prediction using pixel values of neighboring blocks which are coded already to generate predicted blocks.

In the case of the inter prediction mode, the motion predictor 111 searches a reference block optimally matched with the input block in a reference picture stored in the reference picture buffer 190 during a motion prediction process to obtain a motion vector.

The motion compensator 112 performs motion-compensation using the motion vector to generate the predicted block. Here, the motion vector may be a two dimensional vector used for inter prediction and represent an offset between a current coding treeblock and the reference block.

The subtracter 125 generate a residual block based on the residual between the input block and the predicted block, and the transformer 130 transforms the residual block to output a transform coefficient. The quantizer 140 quantizes the transform coefficient to output the quantized coefficient.

The entropy encoder 150 performs entropy encoding based on information obtained during an encoding/quantizing process to output the bitstream. The entropy encoding represents frequently generated symbols as a small number of bits, thereby reducing a size of a bitstream for a coding symbol. Therefore, the compression performance of a video may be expected to be improved through the entropy encoding. The entropy encoder 150 may use an encoding method such as exponential-Golomb coding, context-adaptive variable length coding (CAVLC), context-adaptive binary arithmetic coding (CABAC), or the like, for the entropy encoding.

A coded picture needs to be again decoded and stored in order to be used as a reference picture for performing the inter prediction coding. Therefore, the dequantizer 160 dequantizes the quantized coefficient, and the inverse transformer 170 inversely transforms the dequantized coefficient to output a reconstructed residual block. The adder 175 adds the reconstructed residual block to the predicted block to generate a reconstructed block.

The filter unit 180 is also called an adaptive in-loop filter and applies at least one of deblocking filtering, sample adaptive offset (SAO) compensation, adaptive loop filtering (ALF) to the reconstructed block. The deblocking filtering means that block distortion occurred in a boundary between blocks is removed, and the SAO compensation means that an appropriate offset is added to a pixel value in order to compensate for a coding error. In addition, the ALF means that filtering is performed based on a comparison value between a reconstructed image and an original image.

Meanwhile, the reference picture buffer 190 stores the reconstructed block passing through the filter unit 180 therein.

Figure 2:
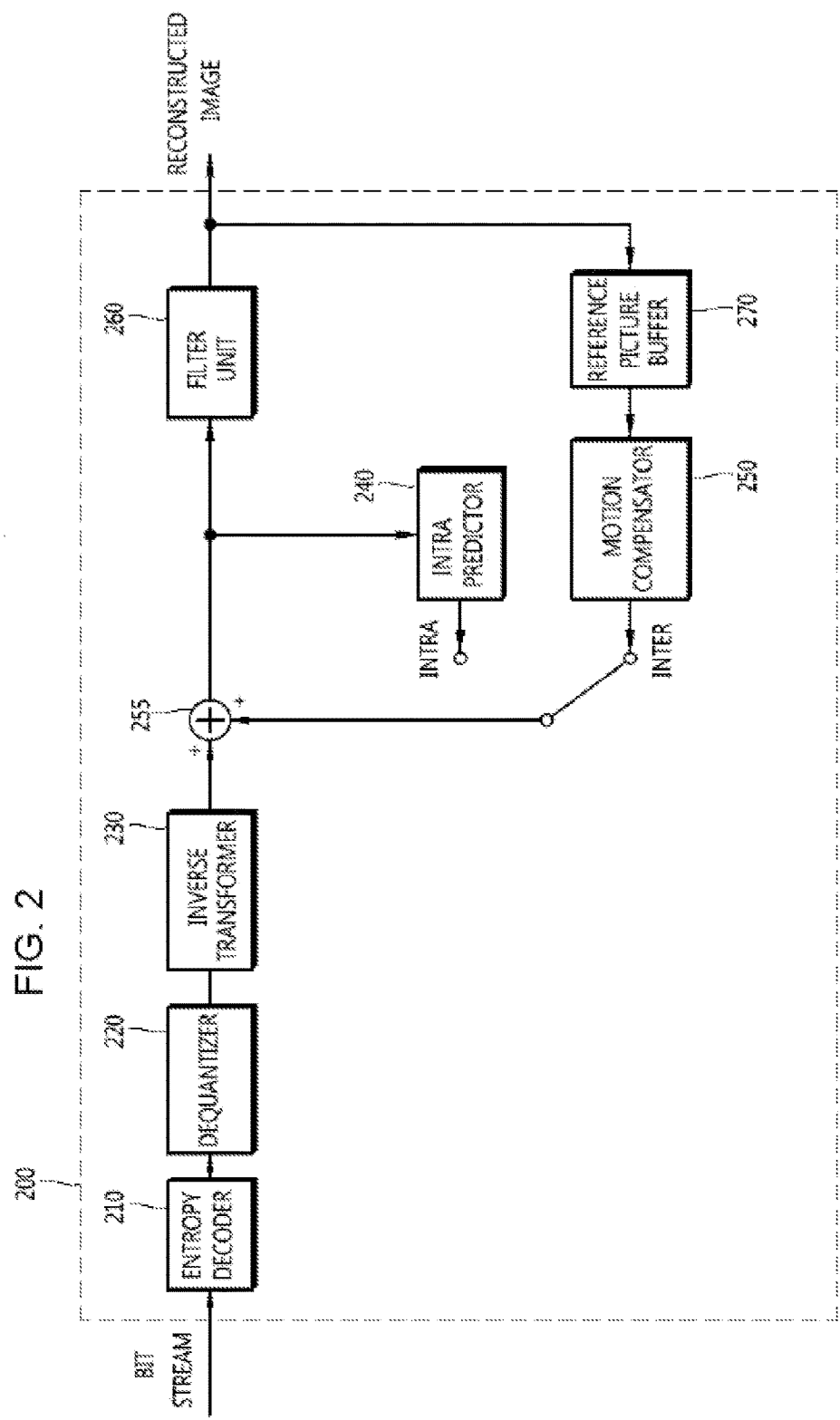
FIG. 2 is a block diagram showing an example of a structure of a decoder according to an exemplary embodiment of the present invention.

As depicted in FIG. 1, an encoder according to the present invention may generate a bitstream. A bitstream generated by an encoder may be stored in a recording medium. And the bitstream stored in a recording medium may be inputted to and decoded by a decoder according to the present invention as depicted in FIG 2. A recording medium may be a non-transitory computer-readable storage medium.

FIG. 2 is a block diagram showing an example of a structure of a decoder according to an exemplary embodiment of the present invention.

Referring to FIG. 2, a decoder includes an entropy decoder 210, a dequantizer 220, an inverse transformer 230, an intra predictor 240, a motion compensator 250, an adder 255, a filter unit 260, and a reference picture buffer 270.

The decoder 200 decodes the bitstream in the intra prediction mode or the inter prediction mode to output a reconstructed image. The decoder 200 is switched between the intra prediction mode and the inter prediction mode through switching of the switch. The decoder 200 obtains a residual block from the bitstream to generate a predicted block and then adds the residual block and the predicted block to each other to generate a reconstructed block.

The entropy decoder 210 performs entropy decoding based on probability distribution. The entropy decoding process is a process opposite to the above-mentioned entropy encoding process. That is, the entropy decoder 210 generates a symbol including a quantized coefficient from the bitstream in which a frequently generated symbol is represented as a small number of bits.

The dequantizer 220 dequantizes the quantized coefficient, and the inverse transformer 230 inversely transforms the dequantized coefficient to generate a residual block.

In the case of the intra prediction mode, the intra predictor 240 performs spatial prediction using pixel values of neighboring blocks which are already coded to generate predicted blocks.

In the case of the inter prediction mode, the motion compensator 250 performs the motion-compensation using the motion vector and the reference picture stored in the reference picture buffer 270 to generate the predicted block.

The adder 255 adds the predicted block to the residual block, and the filter unit 260 applies at least one of deblocking filtering, SAO compensation, ALF to the block passing through the adder to output a reconstructed image.

The reconstructed image may be stored in the reference picture buffer 270 to thereby be used for the motion-compensation.

Hereinafter, a block means an encoding/decoding unit. In an encoding/decoding process, an image is divided at a predetermined size and then encoded/decoded. Therefore, a block may also be called a coding unit (CU), a prediction unit (PU), a transform unit (TU), or the like, and a single block may also be divided into sub-blocks having a smaller size.

Here, a prediction unit means a basic unit in which prediction and/or motion-compensation is performed. A prediction unit may be divided into a plurality of partitions, and each of the partitions may also be called a prediction unit partition. When a prediction unit is divided into the plurality of partitions, each of prediction unit partitions may become a basic unit in which prediction and/or motion-compensation are performed. Hereinafter, in the exemplary embodiment of the present invention, a prediction unit may also means prediction unit partitions.

Meanwhile, in high efficiency video coding (HEVC), a motion vector prediction method based on advanced motion vector prediction (AMVP) is used.

In the motion vector prediction method based on advanced motion vector prediction, a motion vector (MV) of a block, existing in a position that is the same as or corresponds to that of a coding treeblock, in a reference picture as well as motion vectors of reconstructed blocks positioned around the coding treeblock may be used. Here, the block, existing in a position that is the same as or spatially corresponds to that of the coding treeblock, in the reference picture is called a collocated block, and a motion vector of the collocated block is called a collocated motion vector or a temporal motion vector. However, the collocated block may be a block, existing in a position similar to (that is, corresponding to) that of the coding treeblock, in the reference picture as well as a block existing in the same position as that of the coding treeblock.

In a motion information merge method, motion information is estimated from the collocated block as well as reconstructed blocks positioned around the coding treeblock to thereby be used as motion information of the coding treeblock. Here, the motion information includes at least one of inter prediction mode information indicating a reference picture index, a motion vector, a uni-direction, a bi-direction, or the like, required at the time of inter prediction, a reference picture list, and prediction mode information on whether encoding is performed in an intra prediction mode or in an inter prediction mode.

A predicted motion vector in the coding treeblock may be a motion vector of the collocated block, which is a block temporally adjacent to the coding treeblock, as well as motion vectors of neighboring blocks spatially adjacent to the coding treeblock.

Figure 3:
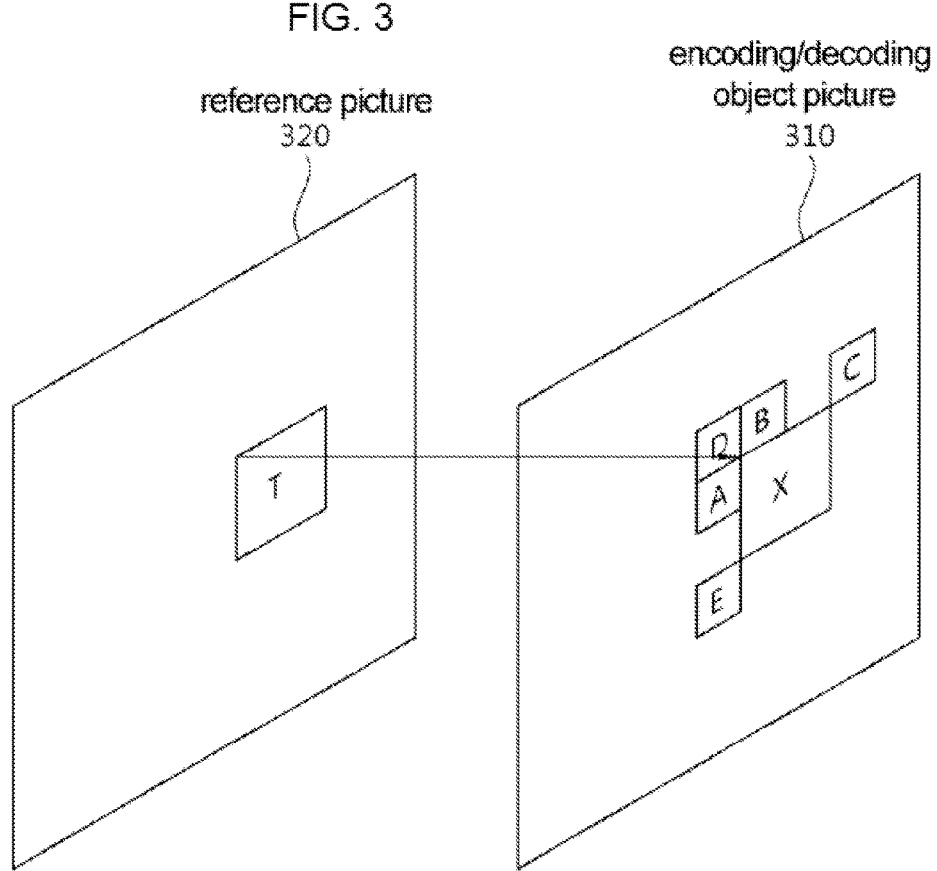
FIG. 3 shows examples of a coding/decoding object picture and a reference picture.

FIG. 3 shows examples of a coding/decoding object picture and a reference picture.

In FIG. 3, a block X indicates a coding treeblock in an encoding/decoding object picture 310, and a block A, a block B, a block C, a block D, and a block E indicate reconstructed blocks positioned around the coding treeblock. In addition, a block T in the reference picture 320 indicates a collocated block existing in a position corresponding to that of the coding treeblock.

Which motion vector in the coding treeblock is used as the predicted motion vector may be recognized through a motion vector predictor index.

TABLE 1

| prediction_unit( x0, y0, log2PUWidth, log2PUHeight ) { | Descriptor |
|---|---|
| if( skip_flag[ x0 ][ y0 ] ) { | |
|   if( NumMVPCand( L0 ) > 1 ) | |
|     mvp_idx_l0[ x0 ][ y0 ] | ue(v)\|ae(v) |
|   if( NumMVPCand( L1 ) > 1 ) | |
|     mvp_idx_l1[ x0 ][ y0 ] | ue(v)\|ae(v) |
| } else if( PredMode = = MODE_INTRA ) { | |
|   ... | |
| } else { /* MODE_MERGE, MODE_INTER */ | |
|   if( merge_flag[ x0 ][ y0 ] && | |
|   NumMergeCandidates > 1 ) { | |
|   ... | |
|   } else { | |
|     if( inter_pred_idc[ x0 ][ y0 ] ! = Pred_L1 ) { | |
|       if( NumMVPCand( L0 ) > 1 ) | |
|         mvp_idx_l0 | ue(v)\|ae(v) |
|     } | |
|     if( inter_pred_idc[ x0 ][ y0 ] != Pred_L0 ) { | |
|       if( NumMVPCand( L1 ) > 1 ) | |
|         mvp_idx_l1 | ue(v)\|ae(v) |
|     } | |
|   } | |
| } | |
| } | |

As shown in Table 1, motion vector predictor indices mvp_idx_l0 and mvp_idx_l1 for each reference picture list are transmitted to a decoder, and the decoder uses the same motion vector as a motion vector predicted by an encoder as a predicted motion vector.

In the case in which the coding treeblock is encoded/decoded using the motion vectors of the neighboring blocks spatially adjacent to the coding treeblock, the motion vector may be stored only with a memory having a relative small size. However, in the case in which a temporal motion vector is used, since all motion vectors of the reference picture needs to be stored in a memory, a memory having a relatively large size is required, and a size of a memory access bandwidth required to fetch data from the memory also increases. Therefore, there is a need to more efficiently store the temporal motion vector in an application environment in which a memory space of a portable terminal, or the like, is not sufficient or power consumption is minimized.

Meanwhile, as a technology of storing a motion vector in a memory, there is a method of reducing a spatial resolution of the motion vector. In this method, the motion vector is compressed in any ratio and then stored in the memory. For example, a motion vector stored in a 4×4 block unit is stored in a 4×4 or more block unit to reduce the number of stored motion vectors. Here, in order to adjust a block size of the stored motion vector, information on a compression ratio is transmitted. The information is transmitted through a sequence parameter set (SPS) as shown in Table 2.

TABLE 2

| seq_parameter_set_rbsp( ) { | C | Descriptor |
|---|---|---|
| ..... | | |
| motion_vector_buffer_comp_flag | 0 | u(1) |
| if ( motion_vector_buffer_comp_flag ) | | |
| motion_vector_buffer_comp_ratio_log2 | 0 | u(8) |
| rbsp_trailing_bits( ) | 0 | |
| } | | |

Referring to Table 2, in the case in which motion_vector_buffer_comp_flag is 1, a motion vector buffer compressing process is performed.

motion_vector_buffer_comp_ratio_log 2 indicates a compression ratio of the motion vector buffer compressing process. In the case in which the motion_vector_buffer_comp_ratio_log 2 does not exist, motion_vector_buffer_comp_ratio_log 2 is estimated to 0, and a motion vector buffer compressing ratio is represented by Equation 1.

$$MVBufferCompRatio=1<<motion\_vector\_buffer\_comp\_ratio\_log 2 \quad \text{[Equation 1]}$$

For example, in the case in which all 4×4 blocks of 1920×1080 pictures have different motion vectors and use two reference picture lists each using two reference pictures, a total memory space of 3.21 Mbytes is required to store a temporal motion vector as described below.

1. Bit depth of 26 bits per one motion vector
    (1) Dynamic range of X component of motion vector: −252 to +7676 (bit depth: 13 bits)
    (2) Dynamic range of Y component of motion vector: −252 to +4316 (bit depth: 13 bits)
    (3) (The dynamic ranges of each component of the motion vector were calculated based on a first prediction unit in a corresponding picture.)
2. In the case in which all of 4×4 block units have different motion vectors: 480×270=129600 blocks
3. Use of two motion vectors per each block
4. The number of reference picture lists: 2
5. Use of two reference pictures per reference picture list=>26 bits×129600 blocks×two motion vectors×two reference picture lists×two reference pictures=26956800 bits=3.21 Mbytes According to the method of reducing a spatial resolution of a motion vector as described above, it is possible to reduce the size of the required memory space and the memory access bandwidth using spatial correlation of the motion vector. However, the method of reducing a spatial resolution of a motion vector does not limit the dynamic range of the motion vector.

When the size of the memory space is reduced to ¼, a size of the memory space required in the above-mentioned example is reduced to about 0.8 Mbytes. Here, when only six bits of the bit depth required for storing the motion vector is used for each component of the motion vector by additionally limiting the dynamic range of the motion vector, the size of the required memory space may be further reduced to 0.37 Mbytes.

Therefore, in the exemplary embodiment of the present invention, the dynamic range of the motion vector is limited in order to reduce a size of a memory space required for storing the motion vector and a memory access bandwidth required for fetching data from the memory. The motion vector of the reference picture of which the dynamic range is limited may be used as a temporal motion vector in the coding treeblock.

Hereinafter, a dynamic range means a range between a minimum value and a maximum value of a negative component or a positive component of a motion vector based on 0, and a bit depth, which indicates a size of a space required for storing the motion vector, means a bit width. In addition, unless particularly described, the motion vector means a motion vector of a reference picture, that is, a temporal motion vector.

In the case in which each component of the motion vector is out of the dynamic range, it is represented by the minimum value or the maximum value of the corresponding dynamic range. For example, in the case in which an X component of the motion vector 312 and a maximum value of a dynamic range of each component of the motion vector 256, the X component of the motion vector is limited to 256.

Likewise, in the case in which a bit depth of each component of the motion vector is 16 bits and the motion vector is (−36, 24), when the bit depth of each component of the motion vector is limited to 6 bits, each component of the motion vector has a dynamic range of −32 to +31, such that the motion vector is represented by (−32, 24), which is in its dynamic range.

Further, in the case in which a bit depth of each component of the motion vector is 16 bits and the motion vector is (−49, 142), when the bit depth of each component of the motion vector is limited to 9 bits, each component of the motion vector has a dynamic range of −256 to +255, such that the motion vector is represented by (−49, 142) without a change.

Figure 4:
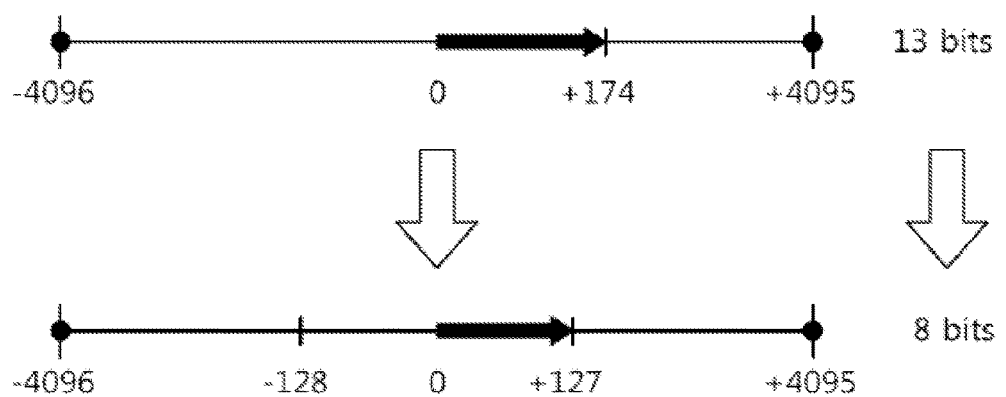
FIG. 4 shows an example of limiting a dynamic range of a motion vector.

FIG. 4 shows an example of limiting a dynamic range of a motion vector.

Referring to FIG. 4, when a dynamic range of a motion vector having a dynamic range of −4096 to +4095 is limited to −128 to +127, a bit depth may be reduced from 13 bits to 8 bits.

Each component of a temporal motion vector is clipped as represented by Equations 2 and 3 in order to be stored in a bit depth of N bit(s). Where N indicates a positive integer.

$$clippedMV\_X=\min(1<<(N-1)-1,\max(-1<<(N-1), MV\_X)) \quad \text{[Equation 2]}$$

$$clippedMV\_Y=\min(1<<(N-1)-1,\max(-1<<(N-1), MV\_Y)) \quad \text{[Equation 3]}$$

Where MV_X indicates an X component of the motion vector, MV_Y indicates a Y component of the motion vector, min(a,b) means an operation of outputting a smaller value in a and b, and max(a,b) means an operation of outputting a larger value in a and b. Each of clippedMV_X and clipped-MV_Y indicates X and Y components of the clipped temporal motion vector and is stored in the memory to thereby be used as a temporal motion vector of the coding treeblock.

For example, as shown in Table 3, in the case in which a size of a memory space is 48 bytes and each component of the motion vector uses a bit depth of 16 bits, a total of twelve motion vectors may be stored.

TABLE 3

| MV1-X | MV1-Y | MV2-X | MV2-Y | MV3-X | MV3-Y | MV4-X | MV4-Y |
|---|---|---|---|---|---|---|---|
| MV5-X | MV5-Y | MV6-X | MV6-Y | MV7-X | MV7-Y | MV8-X | MV8-Y |
| MV9-X | MV9-Y | MV10-X | MV10-Y | MV11-X | MV11-Y | MV12-X | MV12-Y |

However, when each component of the motion vector uses only a bit depth of 8 bits, a total of twenty four motion vectors may be stored as shown in Table 4.

TABLE 4

| MV1-X | MV1-Y | MV2-X | MV2-Y | MV3-X | MV3-Y | MV4-X | MV4-Y |
|---|---|---|---|---|---|---|---|
| MV5-X | MV5-Y | MV6-X | MV6-Y | MV7-X | MV7-Y | MV8-X | MV8-Y |
| MV9-X | MV9-Y | MV10-X | MV10-Y | MV11-X | MV11-Y | MV12-X | MV12-Y |
| MV13-X | MV13-Y | MV14-X | MV14-Y | MV15-X | MV15-Y | MV16-X | MV16-Y |
| MV17-X | MV17-Y | MV18-X | MV18-Y | MV19-X | MV19-Y | MV20-X | MV20-Y |
| MV21-X | MV21-Y | MV22-X | MV22-Y | MV23-X | MV23-Y | MV24-X | MV24-Y |

Therefore, according to the exemplary embodiment of the present invention, when an image reconstructed in an encoder and/or a decoder is subjected to an in-loop filtering process such as a deblocking filter, an adaptive loop filter, or the like, and then stored in a decoded picture buffer (DPB), the dynamic range of the motion vector is limited, such that a motion vector of a reference picture is stored. The decoded picture buffer means the reference picture buffer of FIG. 1 or FIG. 2.

I. Process of Clipping Motion Vector

A process of clipping each component of a motion vector is invoked in the case in which a slice type is not equal to I. The process of clipping a motion vector is performed in a treeblock or largest coding unit (LCU) after a filtering process is finished.

Inputs in the process of clipping a motion vector are a location (xP, yP) specifying the top-left sample of the prediction unit relative to the top-left sample of the current picture, and motion vector matrices MvL0 and MvL1. Outputs in the process are the clipped motion vector matrices CMvL0 and CMvL1.

With respect to the matrices MvL0, MvL1, CMvL0, and CMvL1, operations of Equations 4 to 7 are performed.

$$mvLX=MvLX[xP,yP] \qquad \text{[Equation 4]}$$

$$cmvLX[0]=\text{Clip3}(-1<<(\text{TMVBitWidth}-1),1<<(\text{TMVBitWidth}-1)-1,mvLX[0]) \qquad \text{[Equation 5]}$$

$$cmvLX[1]=\text{Clip3}(-1<<(\text{TMVBitWidth}-1),1<<(\text{TMVBitWidth}-1)-1,mvLX[1]) \qquad \text{[Equation 6]}$$

$$CMvLX[xP,yP]=cmvLX \qquad \text{[Equation 7]}$$

Where TMVBitWidth indicates a bit depth of a motion vector, Clip3(a, b, c) means a function of clipping c so as to exist in a range between a and b.

II. Process of Storing Motion Vector

FIGS. 5 to 8 are flow charts showing a method of storing a motion vector of a reference picture.

Figure 5:
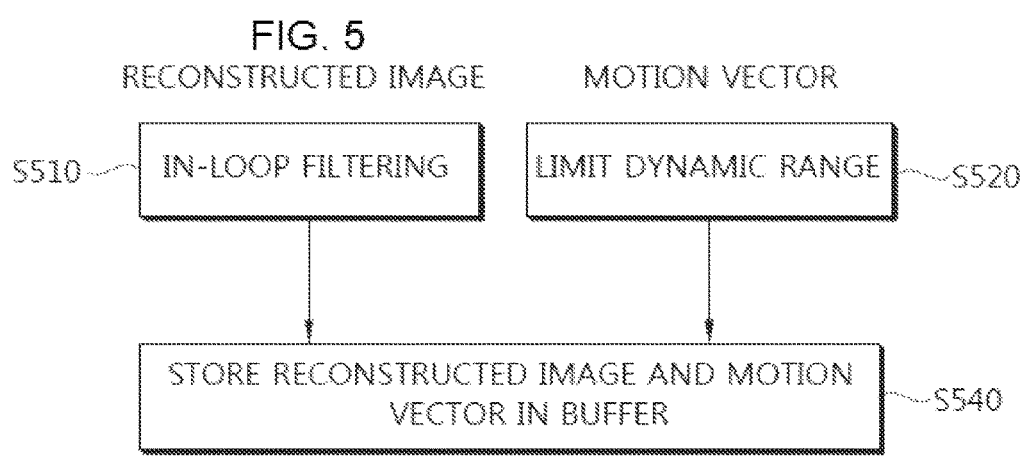
FIGS. 5 to 8 are flow charts showing a method of storing a motion vector of a reference picture.

Referring to FIG. 5, the motion vector of the reference picture may be stored using both of an image buffer storing a reconstructed image and a motion vector buffer storing a motion vector. Here, the reconstructed image is subjected to an in-loop filtering process (S510) and the motion vector is subjected to a limiting dynamic range process (S520) and then stored (S540).

Figure 6:
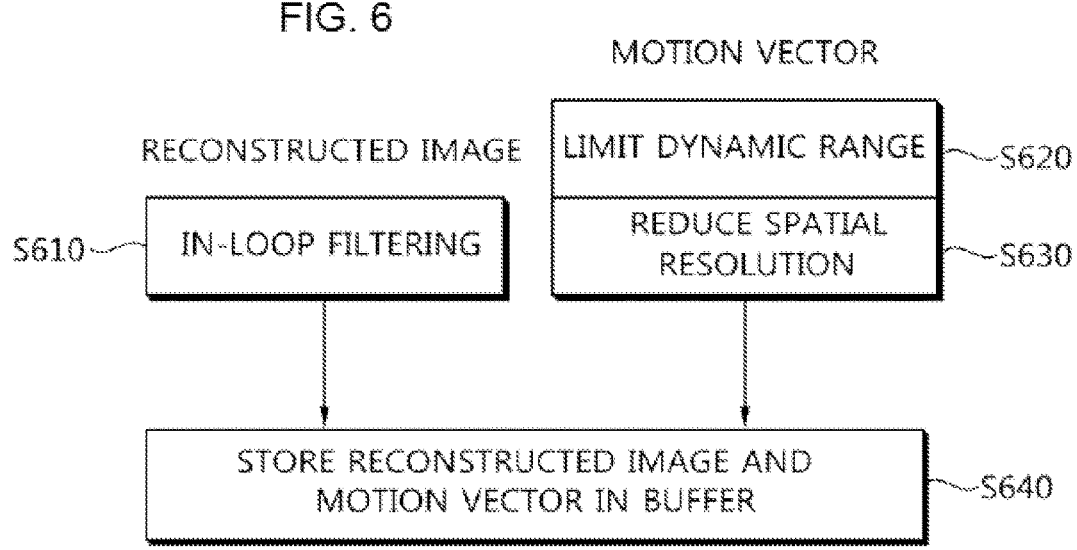

In addition, referring to FIG. 6, both of an image buffer and a motion vector buffer are used, and the motion vector is subjected to a limiting dynamic range process (S620) and a reducing spatial resolution process (S630) and then stored (S640).

Figure 7:
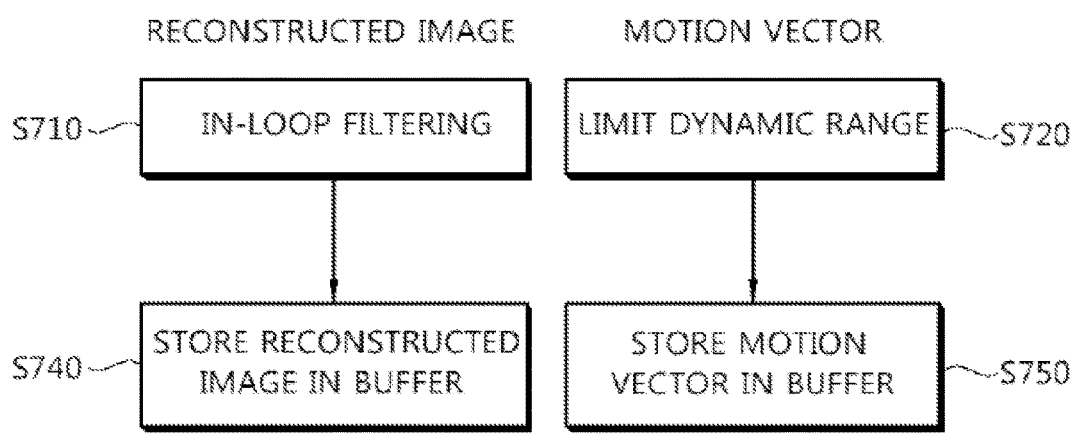

Further, referring to FIG. 7, the reconstructed image is subjected to an in-loop filtering process (S710) and then stored in an image buffer (S740), and the motion vector is subjected to a limiting dynamic range process (S720) and then stored in a motion vector buffer (S750).

Figure 8:
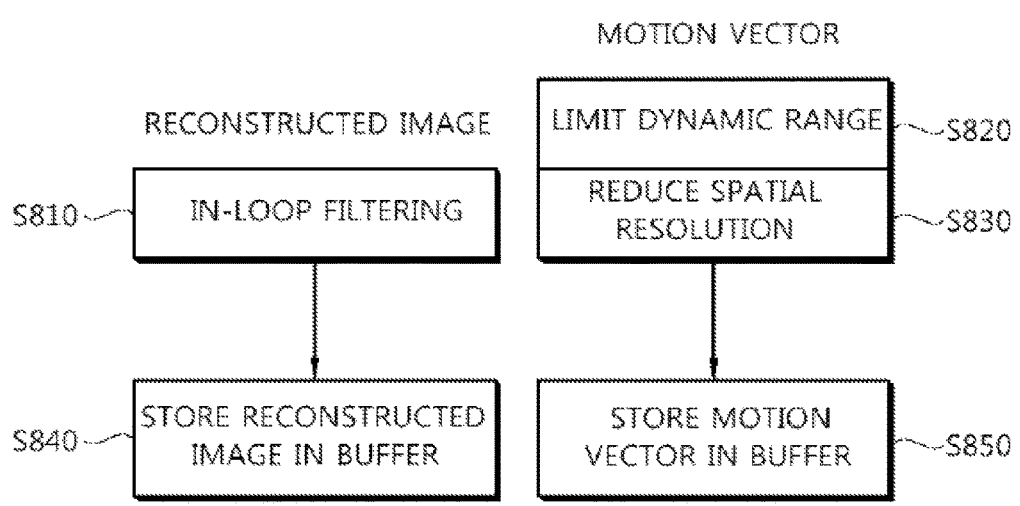

Further, referring to FIG. 8, the reconstructed image is subjected to an in-loop filtering process (S810) and then stored in an image buffer (S840), and the motion vector is subjected to a limiting dynamic range process (S820) and a reducing spatial resolution process (S830) and then stored (S850).

Meanwhile, in the exemplary embodiments of FIGS. 6 and 8, a sequence of the limiting dynamic range process S620 or S820 and the reducing spatial resolution process S630 and S830 is not limited, but may be changed.

In addition, in order to further reduce a memory access bandwidth, dynamic ranges of each component of the motion vector may be differently limited. For example, only one of a dynamic range of an X component and a dynamic range of a Y component may be limited or the dynamic range of the Y component may be further limited as compared to the dynamic range of the X component.

The limited dynamic range of the motion vector is transmitted through a sequence parameter set, a picture parameter set (PPS), a slice header, or the like, and the decoder similarly performs limitation of a dynamic range of a temporal motion vector in the sequence, the picture, or the slice. In this case, a bit depth, which is a size of a memory space required for storing the motion vector represented in the dynamic range may also be transmitted. In addition, it is possible to efficiently store the temporal motion vector so as to be matched to motion characteristics of the image using the dynamic range transmitted through the sequence parameter set, the picture parameter set, the slice header, or the like, rather than storing the motion vector using a bit depth having a fixed size.

Figure 9:
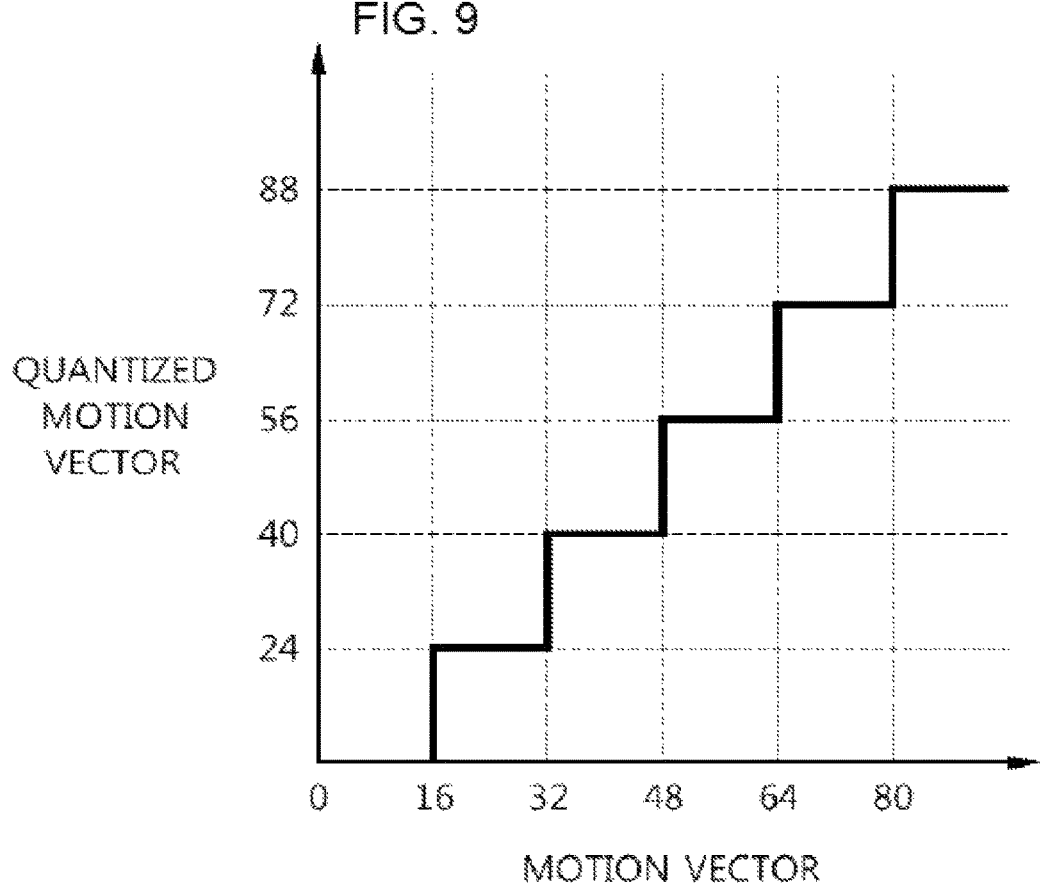
FIG. 9 shows an example of quantizing a motion vector.

Meanwhile, the motion vector may be quantized and stored. In the case in which the motion vector is quantized and stored, precision of the motion vector is reduced. As a quantizing method, there are uniform quantization in which step sizes are uniform, non-uniform quantization in which step sizes are non-uniform, and the like. The step size in the quantization is set to a fixed value predefined between the encoder and the decoder or is transmitted from the encoder to the decoder through the sequence parameter set, the picture parameter set, the slice header, or the like. The decoder uses the quantized motion vector as it is or dequantizes and use the quantized motion vector. FIG. 9 shows an example of quantizing a motion vector. Referring to FIG. 9, in the case in which the motion vector has a component value of 32 to 48, the motion vector is quantized to 40.

In addition, the motion vector may be limited in a representation resolution and the stored. The representation resolution means an integer pixel unit (1 pixel unit), a fraction pixel unit (a ½ pixel unit, a ¼ pixel unit, or the like). For example, a resolution of the motion vector processed in a ¼ pixel unit may be stored as an integer pixel. The representation resolution of the motion vector is set to a fixed value predefined between the encoder and the decoder or is transmitted from the encoder to the decoder through the sequence parameter set, the picture parameter set, the slice header, or the like.

In addition, only with respect to some motion vectors among temporal motion vectors stored in a memory, a limiting dynamic range process, a reducing space resolution process, and a quantizing process of the motion vector may be performed.

In the case in which the dynamic range of the motion vector is limited and stored, information on the dynamic range of the motion vector may be added and stored in the memory. For example, in the case in which the dynamic range of the motion vector is −128 to +127, a flag of 1 may be additionally stored, and in the case in which the dynamic range of the motion vector is −32 to +31, a flag of 0 may be additionally stored. In this case, flag information may be stored together with the motion vector or be stored in a memory different from the memory in which the motion vector is stored. In the case in which the flag information and the motion vector are stored in different memories, when in which dynamic range a specific motion vector is stored is recognized, arbitrary access to the flag information may be allowed. In addition, information on in which dynamic range some motion vectors are stored is transmitted through the sequence parameter set, the picture parameter set, the slice header, or the like, thereby making it possible to allow a decoder to perform an operation similar to that of an encoder.

In the case in which the spatial resolution of the motion vector is reduced and stored, information on a block size of the motion vector may be added and stored in the memory. For example, in the case in which the block size of the motion vector is 4×4, a flag of 1 may be additionally stored, and in the case in which the block size of the motion vector is 16×16, a flag of 0 may be additionally stored. In this case, flag information may be stored together with the motion vector or be stored in a memory different from the memory in which the motion vector is stored. In the case in which the flag information and the motion vector are stored in different memories, when in which block size a specific motion vector is stored is recognized, arbitrary access to the flag information may be allowed. In addition, information on in which block size some motion vectors are stored is transmitted through the sequence parameter set, the picture parameter set, the slice header, or the like, thereby making it possible to allow a decoder to perform an operation similar to that of an encoder.

In the case in which the motion vector is quantized and stored, information on precision of the motion vector may be added and stored in the memory. For example, in the case in which a step size of the quantization is 4, a flag of 1 may be additionally stored, and in the case in which the step size of the quantization is 1, a flag of 0 may be additionally stored. In this case, flag information may be stored together with the motion vector or be stored in a memory different from the memory in which the motion vector is stored. In the case in which the flag information and the motion vector are stored in different memories, when at which step size a specific motion vector is quantized and stored is recognized, arbitrary access to the flag information may be allowed. In addition, information on at which step size some motion vectors are quantized and stored is transmitted through the sequence parameter set, the picture parameter set, the slice header, or the like, thereby making it possible to allow a decoder to perform an operation similar to that of an encoder.

Further, in the case in which motion information is stored in the memory, the spatial resolution of the motion vector may be reduced and stored. Here, the motion information includes at least one of inter prediction mode information indicating a reference picture index, a motion vector, a uni-direction, a bi-direction, or the like, required at the time of inter prediction, a reference picture list, and prediction mode information on whether an intra prediction mode is performed or an inter prediction mode is performed.

For example, motion information of a prediction unit having the largest partition size among a plurality of motion information of a specific region may be stored as representative motion information in the memory. Here, the specific region may include a region in the coding treeblock and regions of neighboring blocks of the coding treeblock. In addition, the specific region may be a region including a block in which the motion information is stored in the case in which the entire picture or slice is divided at a predetermined size.

For example, after motion information, which is coded in a motion information merge method, a coding information skip method, or the like, is excluded from the plurality of motion information included in the specific region, the representative motion information may be stored in the memory.

For example, the most frequently generated motion information among the plurality of motion information included in the specific region may be stored as the representative motion information in the memory. In this case, the number of generation of the motion information for each size of the block, or the like, may be calculated.

For example, motion information at a specific position among the plurality of motion information included in the specific region may be stored. Here, the specific position, which is a position included in the specific region, may be a fixed position of the specific region. In addition, the specific position may be selected as one of a plurality of positions. When the plurality of positions are used, a priority for each position may be determined, and the motion information may be stored in the memory according to the priority.

For example, when the plurality of motion information included in the specific region is stored in the memory, since the motion information does not exist outside a boundary of a block coded in an intra prediction mode, a block coded in a pulse coded modulation (PCM) mode, a slice, or a picture, the motion information of the corresponding position may not be stored in the memory.

In the above-mentioned examples, when the motion information of the specific position is stored, in the case in which the motion information of the corresponding position does not exist, motion information of a collocated block, motion information of a block coded already, or motion information of a neighboring block may be used as the motion information of the corresponding position. Here, the specific position may be one sample position in a neighboring block or a position of the block. For example, in the case in which the motion information of the specific position does not exist, a medium value or average value among motion information of neighboring blocks which are coded in inter prediction may be stored in the memory. For example, in the case in which the motion information of the specific position does not exist, an average value of motion information of neighboring blocks may be stored in the memory. When the medium value and the average value are calculated, in the case in which the motion information of the neighboring blocks is different from at least one of the reference picture index, the reference picture list, and the inter prediction mode information, a size of the motion vector may be adjusted according to the reference picture index, the reference picture list, the inter prediction mode information, a picture order count, and the like.

III. Process of Deriving Motion Vector

In the case in which the motion information is stored in the memory using the above-mentioned motion information methods and the motion information of the reference picture is used in the motion vector prediction method, the advanced motion vector prediction method, or the motion information merge method, the stored motion information may be fetched.

For example, motion information of a position corresponding to that of the coding treeblock in the reference picture may be fetched. In this case, the position corresponding to that of the coding treeblock in the reference picture may be a fixed position in a specific region or a relative position from the position of the coding treeblock.

FIGS. 10 to 13 show examples of fetching motion information from a reference picture.

In FIGS. 10 to 13, a block X indicates a coding treeblock in an encoding/decoding object picture 1010, 1110, 1210, or 1310, and a block A, a block B, a block C, a block D, and a block E indicate reconstructed neighboring blocks. In addition, a block T in the reference picture 1020, 1120, 1220, and 1320 indicates a collocated block corresponding to the coding treeblock. A block Y in the reference picture 1320 of FIG. 13 indicates a block corresponding to a position other than the encoding/decoding objet block.

Figure 10:
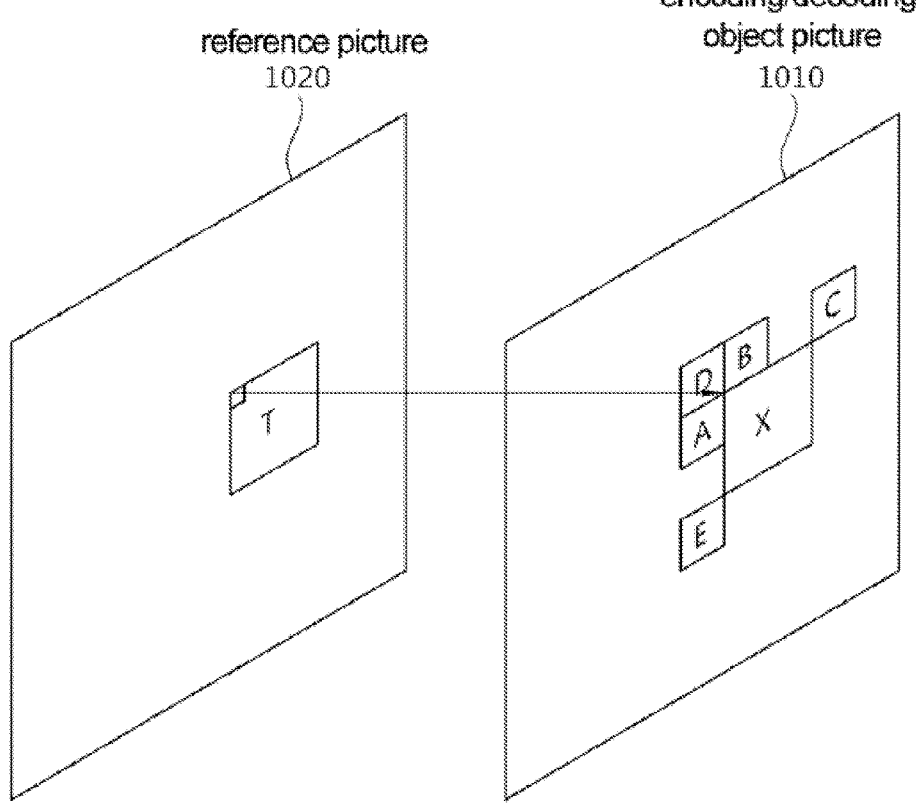
FIGS. 10 to 13 show examples of fetching motion information from a reference picture.

Referring to FIG. 10, motion information corresponding to a position corresponding to a top-left pixel position among positions of a coding treeblock X in a reference picture may be fetched.

Figure 11:
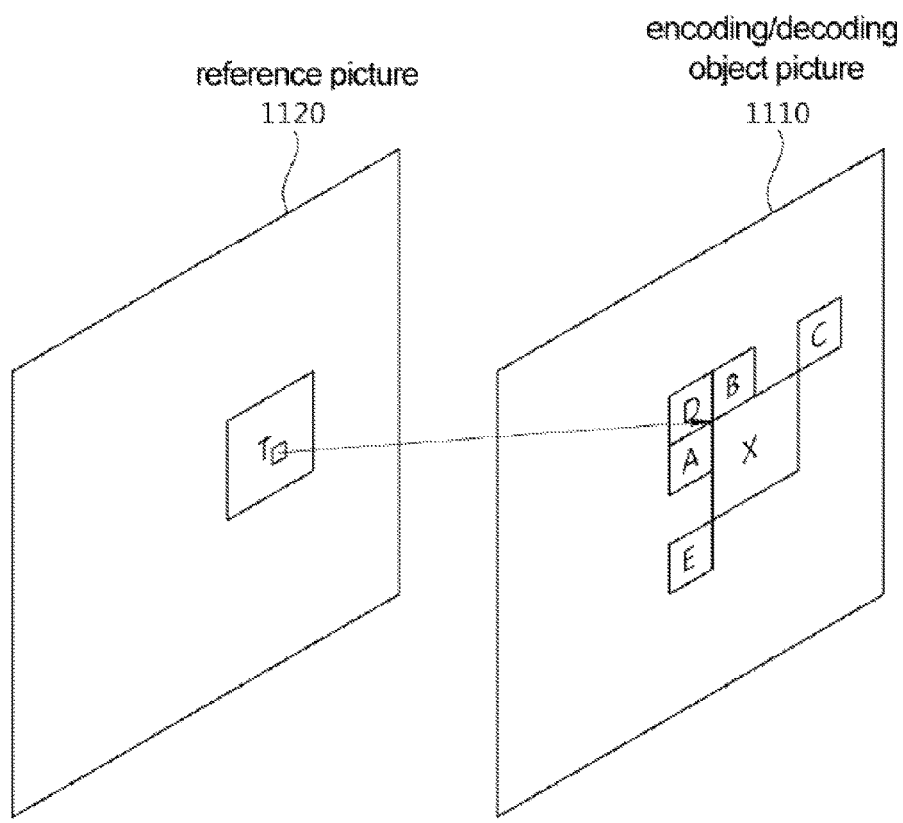

Referring to FIG. 11, motion information corresponding to a position corresponding to a central pixel position among positions of a coding treeblock X in a reference picture may be fetched.

Figure 12:
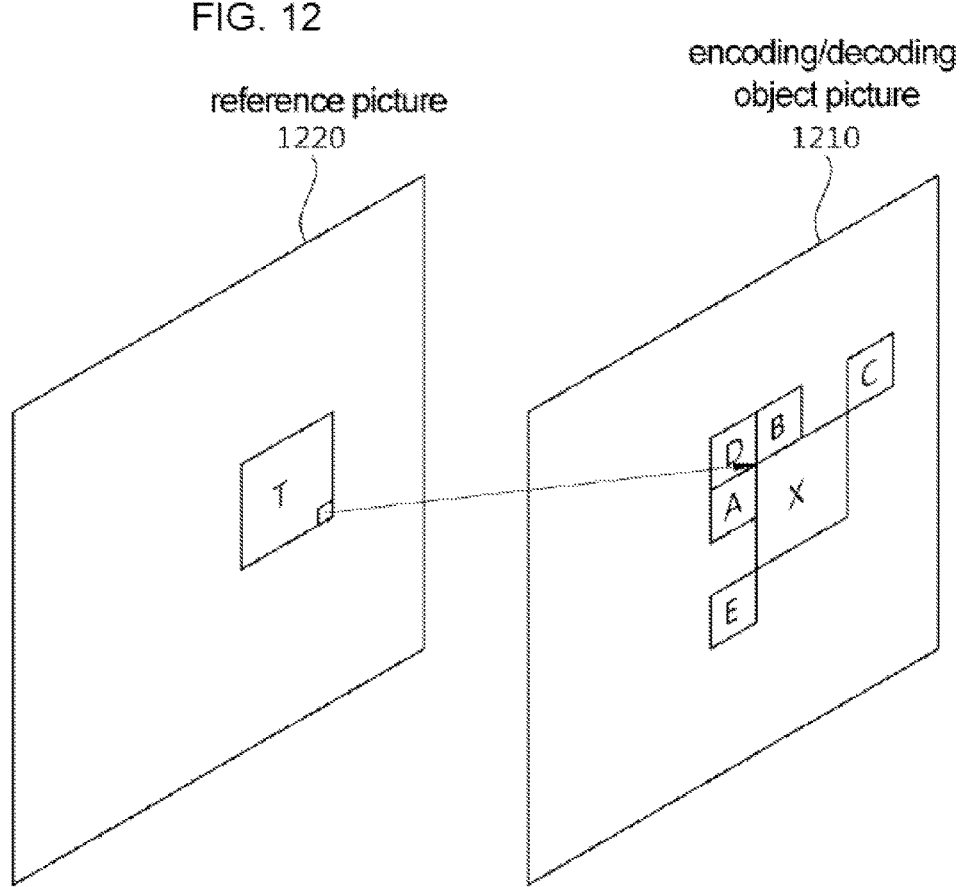

Referring to FIG. 12, motion information corresponding to a position corresponding to a right-bottom pixel position among positions of a coding treeblock X in a reference picture may be fetched.

Figure 13:
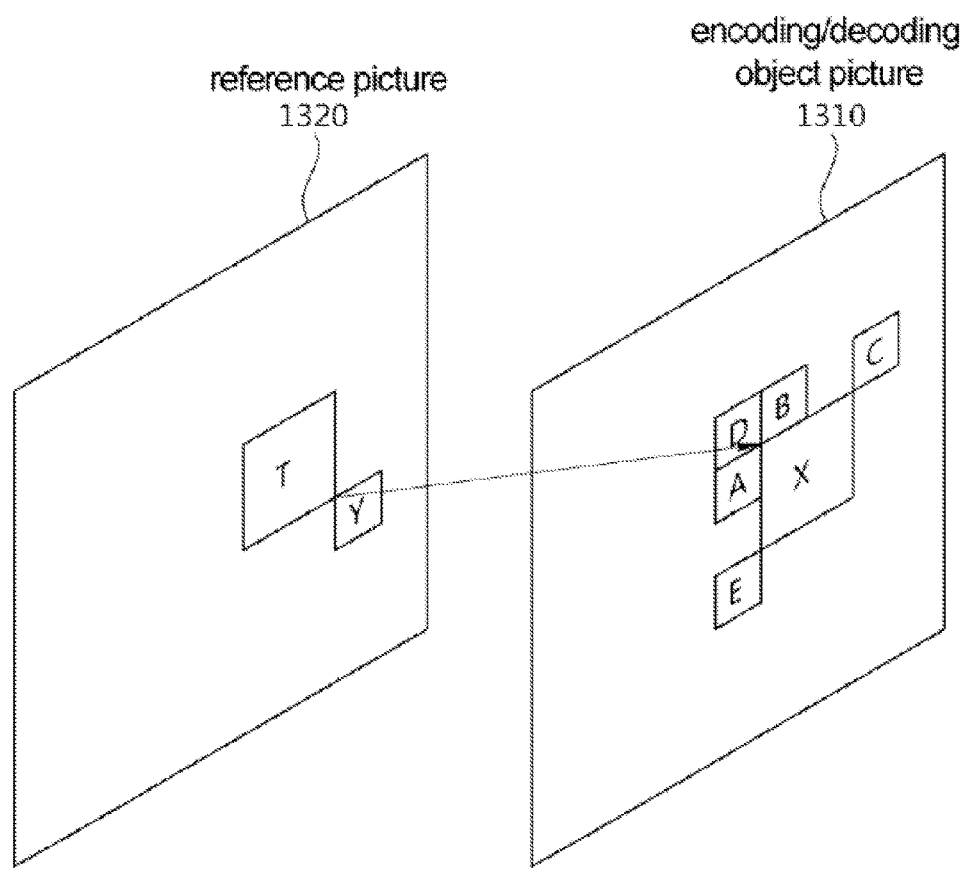

Referring to FIG. 13, motion information corresponding to a position corresponding to a pixel position other than a coding treeblock X in a reference picture may be fetched.

An encoding/decoding method such as motion vector prediction, advanced motion vector prediction, motion information merge, motion information merge skip, or the like, may be performed using the motion information stored in the memory, that is, the motion information of the reference picture.

The motion vector may be stored in the memory using at least one of a method of limiting a dynamic range of a motion vector, a method of reducing a spatial resolution of a motion vector, a method of quantizing a motion vector, and a method of reducing a representation resolution of a motion vector, and the stored motion vector may be used for predicting a motion vector of the coding treeblock and merging motion information thereof.

A process of fetching the motion vector of the reference picture from the memory is called a process of deriving a temporal motion vector. In a process of deriving a temporal motion vector, TMVbitWidth indicates a bit width of a temporal motion vector stored in the memory.

Inputs in the process of deriving a temporal motion vector are a location (xP, yP) specifying the top-left luma sample of the current prediction unit relative to the top-left sample of the current picture, variables specifying the width and the height of the prediction unit for luma, nPSW and nPSH, the reference index of the current prediction unit partition refIdxLX (with X being 0 or 1). Outputs in the process are the motion vector prediction mvLXCol and the availability flag availableFlagLXCol.

The function RefPicOrderCnt(pic, refidx, LX) is specified by the value of PicOrderCnt of the picture that is the reference picture RefPicListX[refidx] of pic with X being 0 or 1. PicOrderCnt of the reference picture shall be maintained until the picture is marked as "non-existing." Clip3(a, b, c) means a function of clipping c so as to exist in a range between a and b.

If slice_type is equal to B and collocated_from_l0_flag is equal to 0, the variable colPic specifies the picture that contains the co-located partition as specified by RefPicList1[0]. Otherwise (slice_type is equal to B and collocated_from_l0_flag is equal to 1 or slice_type is equal to P), the variable colPic specifies the picture that contains the co-located partition as specified by RefPicList0[0].

Variable colPu and its position (xPCol, yPCol) are derived in the following ordered steps:

1. Right-bottom luma position (xPRb, yPRb) of the current prediction unit is defined as represented by Equations 8 and 9.

$$xPRb = xP + nPSW \qquad \text{[Equation 8]}$$

$$yPRb = yP + nPSH \qquad \text{[Equation 9]}$$

2. If colPu is coded in an intra prediction mode or colPu is unavailable, (1) Central luma position of the current prediction unit is defined as represented by Equations 10 and 11.

$$xPCtr = (xP + (nPSW >> 1)) - 1 \qquad \text{[Equation 10]}$$

$$yPCtr = (yP + (nPSH >> 1)) - 1 \qquad \text{[Equation 11]}$$

(2) The variable colPu is set as the prediction unit covering the modified position given by ((xPCtr>>4)<<4, (yPCtr>>4)<<4) inside the colPic.

3. (xPCol, yPCol) is set equal to the top-left luma sample of the colPu relative to the top-left luma sample of the colPic.

The variables mvLXCol and availableFlagLXCol are derived as follows.

1. If colPu is coded in an intra prediction mode or colPu is unavailable, both components of mvLXCol are set equal to 0 and availableFlagLXCol is set equal to 0.

2. Otherwise (colPu is not coded in an intra prediction mode and colPu is available), the variables mvCol and refIdxCol are derived as follows, (1) If PredFlagL0[xPCol][yPCol] is equal to 0, the motion vector mvCol and the reference index refIdxCol are set equal to MvL1[xPCol][yPCol] and RefIdxL1[xPCol][yPCol], respectively.

(2) Otherwise (PredFlagL0[xPCol][yPCol] is equal to 1), the following applies.

1) If PredFlagL1[xPCol][yPCol] is equal to 0, the motion vector mvCol and the reference index refIdxCol are set equal to MvL0[xPCol][yPCol] and RefIdxL0[xPCol][yPCol], respectively.

2) Otherwise (PredFlagL1[xPCol][yPCol] is equal to 1), the following applies.

a. The following assignments are made with X being 0 or 1.

i. RefIdxColLX=RefIdxLX[xPCol][yPCol]

ii. If PicOrderCnt(colPic) is less than PicOrderCnt(currPic) and RefPicOrderCnt(colPic, RefIdxColLX, LX) is greater than PicOrderCnt(currPic) or PicOrderCnt(colPic) is greater than PicOrderCnt(currPic) and RefPicOrderCnt(colPic, RefIdxColLX, LX) is less than PicOrderCnt(currPic), the variable MvXCross is equal to 1.

iii. Otherwise (PicOrderCnt(colPic) is less than PicOrderCnt(currPic) and RefPicOrderCnt(colPic, RefIdxColLX, LX) is less than or equal to PicOrderCnt(currPic) or PicOrderCnt(colPic) is greater than PicOrderCnt(currPic) and RefPicOrderCnt(colPic, RefIdxColLX, LX) is greater than or equal to PicOrderCnt(currPic)), the variable MvXCross is equal to 0.

b. If one of the following conditions is true, the motion vector mvCol, the reference index refIdxCol and ListCol are set equal to MvL1[xPCol][yPCol], RefIdxColL1 and L1, respectively.

i. Mv0Cross is equal to 0 and Mv1Cross is equal to 1.

ii. Mv0Cross is equal to Mv1Cross and reference index list is equal to L1 c. Otherwise, the motion vector mvCol, the reference index refIdxCol and ListCol are set equal to MvL0[xPCol][yPCol], RefIdxColL0 and L0, respectively.

3) the variable availableFlagLXCol is set equal to 1 and operations of Equation 12 or Equations 13 to 18 are applied.

a. If PicOrderCnt(colPic)−RefPicOrderCnt(colPic, refIdxCol, ListCol) is equal to PicOrderCnt(currPic)−RefPicOrderCnt(currPic, refIdxLX, LX), $$mvLXCol=Clip3(-1<<(TMVBitWidth-1),1<<(TMVBitWidth-1)-1,mvCol) \quad \text{[Equation 12]}$$

b. Otherwise, $$tx=(16384+Abs(td/2))/td \quad \text{[Equation 13]}$$

$$DistScaleFactor=Clip3(-1024,1023,(tb*tx+32)>>6) \quad \text{[Equation 14]}$$

$$mvLXCol'=Clip3(-1<<(TMVBitWidth-1),1<<(TMVBitWidth-1)-1,mvCol) \quad \text{[Equation 15]}$$

$$mvLXCol=ClipMv((DistScaleFactor*mvLXCol'+128)>>8) \quad \text{[Equation 16]}$$

where td and tb are derived as Equations 17 and 18.

$$td=Clip3(-128,127,PicOrderCnt(colPic)-RefPicOrderCnt(colPic,refIdxCol,ListCol)) \quad \text{[Equation 17]}$$

$$tb=Clip3(-128,127,PicOrderCnt(currPic)-RefPicOrderCnt(currPic,refIdxLX,LX)) \quad \text{[Equation 18]}$$

That is, referring to Equations 13 to 16, mvLXCol is derived as scaled version of the motion vector mvCol.

Meanwhile, even though the motion vector is clipped in a dynamic range, in the case in which the clipped motion vector is scaled, the clipped motion vector may be again out of the dynamic range. Therefore, after the scaled motion vector is derived, the dynamic range of the motion vector may be limited. In this case, each of Equations 15 and 16 may be replaced with Equations 19 and 20.

$$mvLXCol'=ClipMv((DistScaleFactor*mvLXCol+128)>>8) \quad \text{[Equation 19]}$$

$$mvLXCol=Clip3(-1<<(TMVBitWidth-1),1<<(TMVBitWidth-1)-1,mvCol') \quad \text{[Equation 20]}$$

IV. Method of Transmitting Information for Clipping Temporal Motion Vector in Decoder.

Hereinafter, a method of transmitting information required for clipping a temporal motion vector in a decoder using the same method as that of an encoder will be described.

TMVBitWidth in the process of deriving a temporal motion vector may be transmitted from the encoder to the decoder through a sequence parameter set, a picture parameter set, a slice header, or the like.

TABLE 5

| seq_parameter_set_rbsp( ) { | C | Descriptor |
|---|---|---|
| ..... | | |
| bit_width_temporal_motion_vector_minus8 | 0 | se(v) |
| ..... | | |
| rbsp_trailing_bits( ) | 0 | |
| } | | | bit_width_temporal_motion_vector_minus8 of Table 5 specifies the bit width of the temporal motion vector component. When bit_width_temporal_motion_vector_minus8 is not present, it shall be inferred to be equal to 0. The bit width of temporal motion vector component is specified as follows:

$$TMVBitWidth=bit\_width\_temporal\_motion\_vector\_minus8+8 \quad \text{[Equation 21]}$$

1. Information transmitting method 1—in the case in which motion vector is compressed and bit depth of motion vector is limited

TABLE 6

| seq_parameter_set_rbsp( ) { | C | Descriptor |
|---|---|---|
| ..... | | |
| motion_vector_buffer_comp_flag | 0 | u(1) |
| if ( motion_vector_buffer_comp_flag ) | | |
|   motion_vector_buffer_comp_ratio_log2 | 0 | u(8) |
| bit_depth_temporal_motion_vector_constraint_flag | 0 | u(1) |
| if (bit_depth_temporal_motion_vector_constraint_flag ) | | |
|   bit_depth_temporal_motion_vector_minus8 | 0 | se(v) |
| ..... | | |
| rbsp_trailing_bits( ) | 0 | |
| } | | |

Referring to Table 6, in the case in which motion_vector_buffer_comp_flag equals to 1 specifies the motion vector buffer compression process is applied.

motion_vector_buffer_comp_ratio_log 2 specifies the compression ratio in the motion vector buffer compression process. When motion_vector_buffer_comp_ratio_log 2 is not present, it shall be inferred to be equal to 0. The motion vector buffer compression ratio is specified as follows:

$$MVBufferCompRatio = 1 << motion\_vector\_buffer\_comp\_ratio\_log\ 2 \quad \text{[Equation 22]}$$

Again referring to Table 6, in the case in which bit_depth_temporal_motion_vector_constraint_flag equals to 1 specifies the temporal motion vector bit depth limiting constraint process is applied.

bit_depth_temporal_motion_vector_minus8 specifies the bit depth of the temporal motion vector. When bit_depth_temporal_motion_vector_minus8 is not present, it shall be inferred to be equal to 0. The bit depth of temporal motion vector is specified as follows:

$$TMVBitDepth = bit\_depth\_temporal\_motion\_vector\_minus8 + 8 \quad \text{[Equation 23]}$$

2. Information transmitting method 2—in the case in which bit depth of motion vector is limited

TABLE 7

| seq_parameter_set_rbsp( ) { | C | Descriptor |
|---|---|---|
| ..... | | |
| bit_depth_temporal_motion_vector_constraint_flag | 0 | u(1) |
| if (bit_depth_temporal_motion_vector_constraint_flag ) | | |
|    bit_depth_temporal_motion_vector_minus8 | 0 | se(v) |
| ..... | | |
| rbsp_trailing_bits( ) | | 0 |
| } | | |

Referring to Table 7, in the case in which bit_depth_temporal_motion_vector_constraint_flag equals to 1 specifies the temporal motion vector bit depth constraint process is applied.

bit_depth_temporal_motion_vector_minus8 specifies the bit depth of the temporal motion vector. When bit_depth_temporal_motion_vector_minus8 is not present, it shall be inferred to be equal to 0. The bit depth of temporal motion vector is specified as follows:

$$TMVBitDepth = bit\_depth\_temporal\_motion\_vector\_minus8 + 8 \quad \text{[Equation 24]}$$

3. Information transmitting method 3—in the case in which bit depth of motion vector is limited

TABLE 8

| seq_parameter_set_rbsp( ) { | C | Descriptor |
|---|---|---|
| ..... | | |
| bit_depth_temporal_motion_vector_minus8 | 0 | se(v) |
| ..... | | |
| rbsp_trailing_bits( ) | | 0 |
| } | | | bit_depth_temporal_motion_vector_minus8 specifies the bit depth of the temporal motion vector. When bit_depth_temporal_motion_vector_minus8 is not present, it shall be inferred to be equal to 0. The bit depth of temporal motion vector is specified as follows:

$$TMVBitDepth = bit\_depth\_temporal\_motion\_vector\_minus8 + 8 \quad \text{[Equation 25]}$$

4. Information transmitting method 4—in the case in which bit depth is limited with respect to each of X and Y components of motion vector

TABLE 9

| seq_parameter_set_rbsp( ) { | C | Descriptor |
|---|---|---|
| ..... | | |
| bit_depth_temporal_motion_vector_constraint_flag | 0 | u(1) |
| if (bit_depth_temporal_motion_vector_constraint_flag ) { | | |
|    bit_depth_temporal_motion_vector_x_minus8 | 0 | se(v) |
|    bit_depth_temporal_motion_vector_y_minus8 | 0 | se(v) |
| } | | |
| ..... | | |
| rbsp_trailing_bits( ) | | 0 |
| } | | |

Referring to Table 9, in the case in which bit_depth_temporal_motion_vector_constraint_flag equals to 1 specifies the temporal motion vector bit depth constraint process is applied.

bit_depth_temporal_motion_vector_x_minus8 specifies the bit depth of the temporal motion vector component x. When bit_depth_temporal_motion_vector_x_minus8 is not present, it shall be inferred to be equal to 0. The bit depth of temporal motion vector component x is specified as follows:

$$TMVBitDepth = bit\_depth\_temporal\_motion\_vector\_x\_minus8 + 8 \quad \text{[Equation 26]}$$

bit_depth_temporal_motion_vector_y_minus8 specifies the bit depth of the temporal motion vector component y. When bit_depth_temporal_motion_vector_y_minus8 is not present, it shall be inferred to be equal to 0. The bit depth of temporal motion vector component y is specified as follows:

$$TMVXBitDepth = bit\_depth\_temporal\_motion\_vector\_y\_minus8 + 8 \quad \text{[Equation 27]}$$

5. Information transmitting method 5—in the case in which motion vector is compressed and bit depth of motion vector is limited

TABLE 10

| seq_parameter_set_rbsp( ) { | C | Descriptor |
|---|---|---|
| ..... | | |
| motion_vector_buffer_comp_flag | 0 | u(1) |
| if ( motion_vector_buffer_comp_flag ) { | | |
|    motion_vector_buffer_comp_ratio_log2 | 0 | u(8) |
|    bit_depth_temporal_motion_vector_minus8 | 0 | se(v) |
| } | | |
| ..... | | |
| rbsp_trailing_bits( ) | | 0 |
| } | | |

Referring to Table 10, in the case in which motion_vector_buffer_comp_flag equals to 1 specifies the motion vector buffer compression process is applied.

motion_vector_buffer_comp_ratio_log 2 specifies the compression ratio in the motion vector buffer compression process. When motion_vector_buffer_comp_ratio_log 2 is not present, it shall be inferred to be equal to 0. The motion vector buffer compression ratio is specified as follows:

$$MVBufferCompRatio = 1 << motion\_vector\_buffer\_comp\_ratio\_log\ 2 \quad \text{[Equation 28]}$$

V. Definition of Dynamic Range Through Levels of Video Codec

The dynamic range of the temporal motion vector may be defined through a level of a video codec rather than being transmitted through the sequence parameter set, the picture parameter set, or the slice header. The encoder and the decoder may determine a limited dynamic range of the motion vector using level information.

Further, even in the levels, dynamic ranges and/or bit depths of each of the X and Y components of the motion vector may be differently defined, and minimum values and maximum values of each of the components may be defined.

Tables 11 and 12 show an example of a case in which TMVBitWidth in the process of deriving a temporal motion vector described above is defined in the levels.

TABLE 11

| Level number | MaxTMVBitWidth (Max Temporal MV component bit width) |
|---|---|
| 1 | 8 |
| 1b | 8 |
| 1.1 | 8 |
| 1.2 | 8 |
| 1.3 | 8 |
| 2 | 8 |
| 2.1 | 8 |
| 2.2 | 8 |
| 3 | 8 |
| 3.1 | 10 |
| 3.2 | 10 |
| 4 | 10 |
| 4.1 | 10 |
| 4.2 | 10 |
| 5 | 10 |
| 5.1 | 10 |

Referring to Table 11, TMVBitWidth is set as MaxTMVBitWidth defined in the levels. Here, MaxTMVBitWidth indicates a maximum bit width of a temporal motion vector when the temporal motion vector is stored in the memory.

Meanwhile, TMVBitWidth may also be defined in the levels, and a difference from the defined value (a delta value) may be transmitted through the sequence parameter set, the picture parameter set, or the slice header. That is, TMVBitWidth may be set to as a value obtained by adding the difference transmitted through the sequence parameter set, the picture parameter set, or the slice header to MaxTMVBitWidth defined in the levels. Here, TMVBitWidth indicates a bit width of the temporal motion vector when the temporal motion vector is stored in the memory.

TABLE 12

| Level number | MaxTMVBitWidth (Max Temporal MV component bit depth) |
|---|---|
| 1 | 8 |
| 1b | 8 |
| 1.1 | 8 |
| 1.2 | 8 |
| 1.3 | 8 |
| 2 | 8 |
| 2.1 | 8 |
| 2.2 | 8 |
| 3 | 8 |
| 3.1 | 10 |
| 3.2 | 10 |
| 4 | 10 |
| 4.1 | 10 |
| 4.2 | 10 |
| 5 | 10 |
| 5.1 | 10 |

TABLE 13

| seq_parameter_set_rbsp( ) { | C | Descriptor |
|---|---|---|
| ..... | | |
| delta_bit_width_temporal_motion_vector_minus8 | 0 | se(v) |
| ..... | | |
| rbsp_trailing_bits( ) | 0 | |
| } | | | delta_bit_width_temporal_motion_vector_minus8 specifies the delta bit width of the temporal motion vector component. When delta_bit_width_temporal_motion_vector_minus8 is not present, it shall be inferred to be equal to 0. The bit width of temporal motion vector component is specified as follows:

$$\text{TMVBitWidth} = \text{delta\_bit\_width\_temporal\_motion\_vector\_minus8} + \text{MaxTMVBitWidth} \quad \text{[Equation 29]}$$

In addition, as shown in Table 14, dynamic ranges of each component of the temporal motion vector may also be defined in levels.

TABLE 14

| Level number | MaxMBPS (Max macroblock processing rate) (MB/s) | MaxFS (Max picture size) (MBs) | MaxDpbMbs (Max decoded picture buffer size) (MBs) | MaxBR (Max video bit rate) (1000 bits/s, 1200 bits/s, cpbBrVdFactor bits/s, or cpbBrNalFactor bits/s) | MaxCPB (Max CPB size) (1000 bits, 1200 bits, pbBrVdFactor bits, or cpbBrNalFactor bits) | MaxTmvR (Max Temporal MV component range (luma picture samples) | MinCR (Min compression ratio) | MaxMvsPer2Mb (Max number of motion vectors per two consecutive MBs) |
|---|---|---|---|---|---|---|---|---|
| 1 | 1 485 | 99 | 396 | 64 | 175 | [−64, +63.75] | 2 | — |
| 1b | 1 485 | 99 | 396 | 128 | 350 | [−64, +63.75] | 2 | — |
| 1.1 | 3 000 | 396 | 900 | 192 | 500 | [−128, +127.75] | 2 | — |
| 1.2 | 6 000 | 396 | 2 376 | 384 | 1 000 | [−128, +127.75] | 2 | — |
| 1.3 | 11 880 | 396 | 2 376 | 768 | 2 000 | [−128, +127.75] | 2 | — |
| 2 | 11 880 | 396 | 2 376 | 2 000 | 2 000 | [−128, +127.75] | 2 | — |
| 2.1 | 19 800 | 792 | 4 752 | 4 000 | 4 000 | [−256, +255.75] | 2 | — |
| 2.2 | 20 250 | 1 620 | 8 100 | 4 000 | 4 000 | [−256, +255.75] | 2 | — |
| 3 | 40 500 | 1 620 | 8 100 | 10 000 | 10 000 | [−256, +255.75] | 2 | 32 |
| 3.1 | 108 000 | 3 600 | 18 000 | 14 000 | 14 000 | [−512, +511.75] | 4 | 16 |
| 3.2 | 216 000 | 5 120 | 20 480 | 20 000 | 20 000 | [−512, +511.75] | 4 | 16 |

TABLE 14-continued

| Level number | MaxMBPS (Max macroblock processing rate) (MB/s) | MaxFS (Max picture size) (MBs) | MaxDpbMbs (Max decoded picture buffer size) (MBs) | MaxBR (Max video bit rate) (1000 bits/s, 1200 bits/s, cpbBrVdFactor bits/s, or cpbBrNalFactor bits/s) | MaxCPB (Max CPB size) (1000 bits, 1200 bits, pbBrVdFactor bits, or cpbBrNalFactor bits) | MaxTmvR (Max Temporal MV component range (luma picture samples) | MinCR (Min compression ratio) | MaxMvsPer2Mb (Max number of motion vectors per two consecutive MBs) |
|---|---|---|---|---|---|---|---|---|
| 4   | 245 760 | 8 192  | 32 768  | 20 000  | 25 000  | [−512, +511.75] | 4 | 16 |
| 4.1 | 245 760 | 8 192  | 32 768  | 50 000  | 62 500  | [−512, +511.75] | 2 | 16 |
| 4.2 | 522 240 | 8 704  | 34 816  | 50 000  | 62 500  | [−512, +511.75] | 2 | 16 |
| 5   | 589 824 | 22 080 | 110 400 | 135 000 | 135 000 | [−512, +511.75] | 2 | 16 |
| 5.1 | 983 040 | 36 864 | 184 320 | 240 000 | 240 000 | [−512, +511.75] | 2 | 16 |

In addition, as shown in Tables 15 to 17, bit widths of each component of the temporal motion vector may also be defined in levels.

TABLE 15

| Level number | MaxMBPS (Max macroblock processing rate) (MB/s) | MaxFS (Max picture size) (MBs) | MaxDpbMbs (Max decoded picture buffer size) (MBs) | MaxBR (Max video bit rate) (1000 bits/s, 1200 bits/s, cpbBrVdFactor bits/s, or cpbBrNalFactor bits/s) | MaxCPB (Max CPB size) (1000 bits, 1200 bits, cpbBrVdFactor bits, or cpbBrNalFactor bits) | MaxTMVBitWidth (Max Temporal MV component bit width) | MinCR (Min compression ratio) | MaxMvsPer2Mb (Max number of motion vectors per two consecutive MBs) |
|---|---|---|---|---|---|---|---|---|
| 1   | 1 485   | 99     | 396     | 64      | 175     | 8  | 2 | — |
| 1b  | 1 485   | 99     | 396     | 128     | 350     | 8  | 2 | — |
| 1.1 | 3 000   | 396    | 900     | 192     | 500     | 8  | 2 | — |
| 1.2 | 6 000   | 396    | 2 376   | 384     | 1 000   | 8  | 2 | — |
| 1.3 | 11 880  | 396    | 2 376   | 768     | 2 000   | 8  | 2 | — |
| 2   | 11 880  | 396    | 2 376   | 2 000   | 2 000   | 8  | 2 | — |
| 2.1 | 19 800  | 792    | 4 752   | 4 000   | 4 000   | 8  | 2 | — |
| 2.2 | 20 250  | 1 620  | 8 100   | 4 000   | 4 000   | 8  | 2 | — |
| 3   | 40 500  | 1 620  | 8 100   | 10 000  | 10 000  | 8  | 2 | 32 |
| 3.1 | 108 000 | 3 600  | 18 000  | 14 000  | 14 000  | 10 | 4 | 16 |
| 3.2 | 216 000 | 5 120  | 20 480  | 20 000  | 20 000  | 10 | 4 | 16 |
| 4   | 245 760 | 8 192  | 32 768  | 20 000  | 25 000  | 10 | 4 | 16 |
| 4.1 | 245 760 | 8 192  | 32 768  | 50 000  | 62 500  | 10 | 2 | 16 |
| 4.2 | 522 240 | 8 704  | 34 816  | 50 000  | 62 500  | 10 | 2 | 16 |
| 5   | 589 824 | 22 080 | 110 400 | 135 000 | 135 000 | 10 | 2 | 16 |
| 5.1 | 983 040 | 36 864 | 184 320 | 240 000 | 240 000 | 10 | 2 | 16 |

TABLE 16

| Level number | MaxMBPS (Max macroblock processing rate) (MB/s) | MaxFS (Max picture size) (MBs) | MaxDpbMbs (Max decoded picture buffer size) (MBs) | MaxBR (Max video bit rate) (1000 bits/s, 1200 bits/s, cpbBrVdFactor bits/s, or cpbBrNalFactor bits/s) | MaxCPB (Max CPB size) (1000 bits, 1200 bits, cpbBrVdFactor bits, or cpbBrNalFactor bits) | MaxTMVBitWidth (Max Temporal MV component bit width) | MinCR (Min compression ratio) | MaxMvsPer2Mb (Max number of motion vectors per two consecutive MBs) |
|---|---|---|---|---|---|---|---|---|
| 1   | 1 485   | 99    | 396    | 64     | 175    | 6  | 2 | — |
| 1b  | 1 485   | 99    | 396    | 128    | 350    | 6  | 2 | — |
| 1.1 | 3 000   | 396   | 900    | 192    | 500    | 7  | 2 | — |
| 1.2 | 6 000   | 396   | 2 376  | 384    | 1 000  | 7  | 2 | — |
| 1.3 | 11 880  | 396   | 2 376  | 768    | 2 000  | 7  | 2 | — |
| 2   | 11 880  | 396   | 2 376  | 2 000  | 2 000  | 7  | 2 | — |
| 2.1 | 19 800  | 792   | 4 752  | 4 000  | 4 000  | 8  | 2 | — |
| 2.2 | 20 250  | 1 620 | 8 100  | 4 000  | 4 000  | 8  | 2 | — |
| 3   | 40 500  | 1 620 | 8 100  | 10 000 | 10 000 | 8  | 2 | 32 |
| 3.1 | 108 000 | 3 600 | 18 000 | 14 000 | 14 000 | 10 | 4 | 16 |
| 3.2 | 216 000 | 5 120 | 20 480 | 20 000 | 20 000 | 10 | 4 | 16 |
| 4   | 245 760 | 8 192 | 32 768 | 20 000 | 25 000 | 10 | 4 | 16 |
| 4.1 | 245 760 | 8 192 | 32 768 | 50 000 | 62 500 | 10 | 2 | 16 |
| 4.2 | 522 240 | 8 704 | 34 816 | 50 000 | 62 500 | 10 | 2 | 16 |

TABLE 16-continued

| Level number | MaxMBPS (Max macroblock processing rate) (MB/s) | MaxFS (Max picture size) (MBs) | MaxDpbMbs (Max decoded picture buffer size) (MBs) | MaxBR (Max video bit rate) (1000 bits/s, 1200 bits/s, cpbBrVdFactor bits/s, or cpbBrNalFactor bits/s) | MaxCPB (Max CPB size) (1000 bits, 1200 bits, cpbBrVdFactor bits, or cpbBrNalFactor bits) | MaxTMVBitWidth (Max Temporal MV component bit width) | MinCR (Min compression ratio) | MaxMvsPer2Mb (Max number of motion vectors per two consecutive MBs) |
|---|---|---|---|---|---|---|---|---|
| 5 | 589 824 | 22 080 | 110 400 | 135 000 | 135 000 | 10 | 2 | 16 |
| 5.1 | 983 040 | 36 864 | 184 320 | 240 000 | 240 000 | 10 | 2 | 16 |

TABLE 17

| Level number | MaxTMVBitWidth (Max Temporal MV component bit width) |
|---|---|
| 1 | 8 |
| 1b | 8 |
| 1.1 | 8 |
| 1.2 | 8 |
| 1.3 | 8 |
| 2 | 8 |
| 2.1 | 8 |
| 2.2 | 8 |
| 3 | 8 |
| 3.1 | 10 |
| 3.2 | 10 |
| 4 | 10 |
| 4.1 | 10 |
| 4.2 | 10 |
| 5 | 10 |
| 5.1 | 10 |

In addition, as shown in Table 18, a bit width of a Y component of the temporal motion vector may also be defined in levels.

In the case in which TMVBitWidth is fixed to the same value and used in the encoder and the decoder, TMVBitWidth may be a positive integer such as 4, 6, 8, 10, 12, 14, 16, or the like. Here, TMVBitWidth indicates the bit width of the temporal motion vector when the temporal motion vector is stored in the memory.

Figure 14:
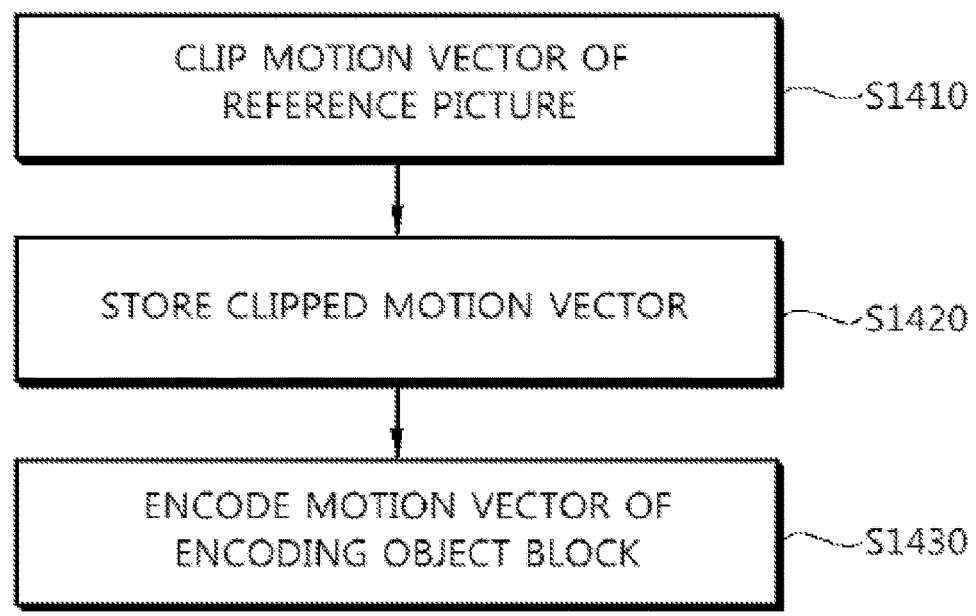
FIG. 14 is a flow chart showing a method of encoding an image according to the exemplary embodiment of the present invention.

FIG. 14 is a flow chart showing a method of encoding an image according to the exemplary embodiment of the present invention. Referring to FIG. 14, the method of encoding an image includes a clipping step (S1410), a storing step (S1420), and an encoding step (S1430).

An apparatus of encoding an image and/or an apparatus of decoding an image clip a motion vector of a reference picture in a predetermined dynamic range (S1410). As described above through "I. Process of clipping motion vector", the motion vector that is out of the dynamic range is represented by a minimum value or a maximum value of the corresponding dynamic range. Therefore, as described above through "IV. Method of transmitting information for clipping temporal motion vector in decoder" and "V. Definition of dynamic range through levels of video codec", the

TABLE 18

| Level number | MaxMBPS (Max macroblock processing rate) (MB/s) | MaxFS (Max picture size) (MBs) | MaxDpbMbs (Max decoded picture buffer size) (MBs) | MaxBR (Max video bit rate) (1000 bits/s, 1200 bits/s, cpbBrVdFactor bits/s, or cpbBrNalFactor bits/s) | MaxCPB (Max CPB size) (1000 bits, 1200 bits, cpbBrVdFactor bits, or cpbBrNalFactor bits) | MaxTMVYBitWidth (Max Vertical Temporal MV component bit depth) | MinCR (Min compression ratio) | MaxMvsPer2Mb (Max number of motion vectors per two consecutive MBs) |
|---|---|---|---|---|---|---|---|---|
| 1 | 1 485 | 99 | 396 | 64 | 175 | 8 | 2 | — |
| 1b | 1 485 | 99 | 396 | 128 | 350 | 8 | 2 | — |
| 1.1 | 3 000 | 396 | 900 | 192 | 500 | 8 | 2 | — |
| 1.2 | 6 000 | 396 | 2 376 | 384 | 1 000 | 8 | 2 | — |
| 1.3 | 11 880 | 396 | 2 376 | 768 | 2 000 | 8 | 2 | — |
| 2 | 11 880 | 396 | 2 376 | 2 000 | 2 000 | 8 | 2 | — |
| 2.1 | 19 800 | 792 | 4 752 | 4 000 | 4 000 | 8 | 2 | — |
| 2.2 | 20 250 | 1 620 | 8 100 | 4 000 | 4 000 | 8 | 2 | — |
| 3 | 40 500 | 1 620 | 8 100 | 10 000 | 10 000 | 8 | 2 | 32 |
| 3.1 | 108 000 | 3 600 | 18 000 | 14 000 | 14 000 | 10 | 4 | 16 |
| 3.2 | 216 000 | 5 120 | 20 480 | 20 000 | 20 000 | 10 | 4 | 16 |
| 4 | 245 760 | 8 192 | 32 768 | 20 000 | 25 000 | 10 | 4 | 16 |
| 4.1 | 245 760 | 8 192 | 32 768 | 50 000 | 62 500 | 10 | 2 | 16 |
| 4.2 | 522 240 | 8 704 | 34 816 | 50 000 | 62 500 | 10 | 2 | 16 |
| 5 | 589 824 | 22 080 | 110 400 | 135 000 | 135 000 | 10 | 2 | 16 |
| 5.1 | 983 040 | 36 864 | 184 320 | 240 000 | 240 000 | 10 | 2 | 16 |

In addition, the dynamic range of the temporal motion vector may be defined as a fixed value predefined between the encoder and the decoder without transmission of information on a limitation of the motion vector or be stored in a form of a fixed bit depth.

bit depth is limited through the level of the video codec, the sequence parameter set, and the like, or the dynamic range is limited through the level of the video codec, thereby making it possible to clip the motion vector of the reference picture in the predetermined dynamic range.

The apparatus of encoding an image and/or the apparatus of decoding an image store the clipped motion vector of the reference picture in a buffer as described above through "II. Process of storing motion vector" (S1420). The motion vector may be stored in the buffer together with or separately from the reconstructed image.

The apparatus of encoding an image encodes a motion vector of a coding treeblock using the stored motion vector of the reference picture (S1430). As described above through "III. Process of deriving motion vector", in the advanced motion vector prediction method used in the HEVC, a motion vector of a block existing in a position that is the same or corresponds to that of the coding treeblock in the reference picture as well as motion vectors of reconstructed blocks positioned around the coding treeblock may be used. Therefore, the motion vector of the coding treeblock may also be a motion vector of the reference picture, that is, a temporal motion vector, as well as motion vectors of neighboring blocks adjacent to the coding treeblock.

Meanwhile, since dynamic range of X component and Y component of the motion vector of the reference picture may be differently defined, each component of the motion vector of the reference picture may be clipped in each dynamic range.

In addition, a method of compressing a motion vector of a reference picture as well as a method of limiting a dynamic range of a motion vector of a reference picture may be used. In the case of limiting the dynamic range of the motion vector of the reference picture or compressing the motion vector of the reference picture, a flag indicating the dynamic range and the motion vector and a parameter related thereto may be defined in a level of a video codec, a sequence parameter set, or the like.

In addition, an encoding method such as motion vector prediction, advanced motion vector prediction, motion information merge, motion information merge skip, or the like, may be performed using the motion information stored in the memory, that is, the motion information of the reference picture.

Figure 15:
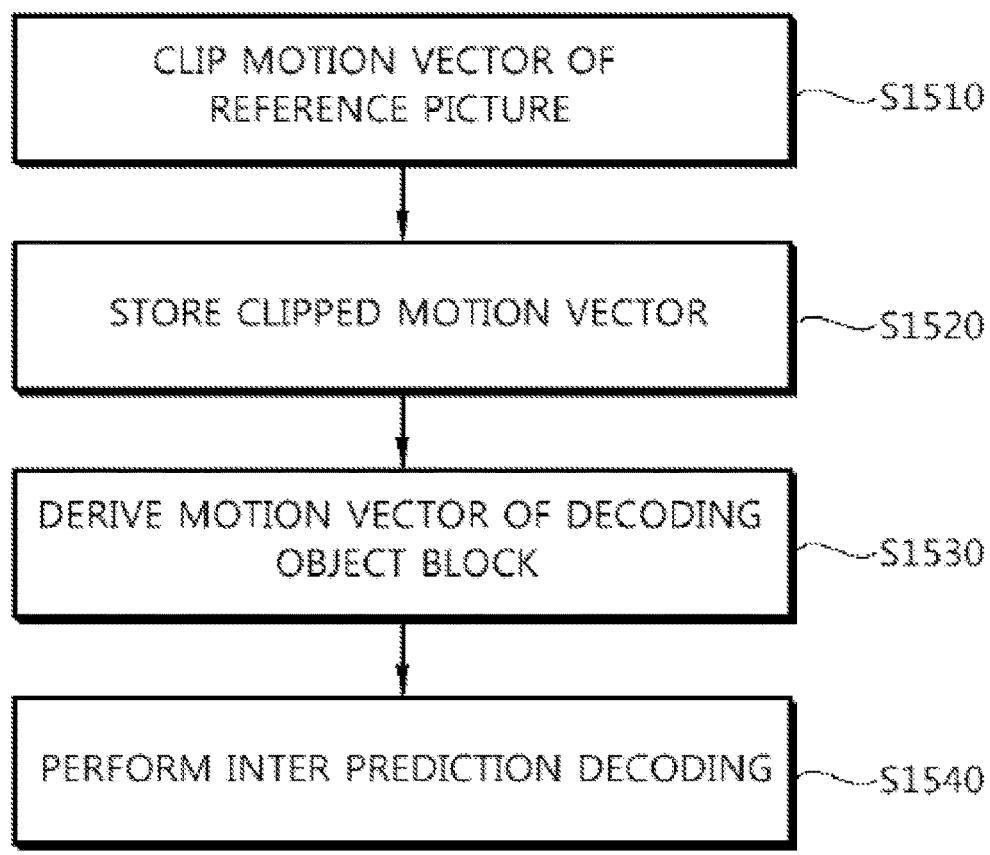
FIG. 15 is a flow chart showing a method of decoding an image according to the exemplary embodiment of the present invention.

FIG. 15 is a flow chart showing a method of decoding an image according to the exemplary embodiment of the present invention. Referring to FIG. 15, the method of decoding an image includes a clipping step (S1510), a storing step (S1520), a deriving step (S1530), and a decoding step (S1540).

The clipping step (S1510) and the storing step (S1520) of FIG. 15 are similar to the clipping step (S1410) and the storing step (S1420) of FIG. 14 using "I. Process of clipping motion vector" and "II. Process of storing motion vector" described above. In addition, the deriving step (S1530) of FIG. 15 uses "III. Process of deriving motion vector" described above and is symmetrical to the encoding step (S1430) of FIG. 14. Therefore, a detailed description thereof will be omitted.

An apparatus of decoding an image performs inter prediction decoding using a motion vector of a coding treeblock (S1540). The apparatus of decoding an image may store a motion vector in a memory using at least one of a method of limiting a dynamic range of a motion vector, a method of reducing a spatial resolution of a motion vector, a method of quantizing a motion vector, and a method of reducing a representation resolution of a motion vector, and use the stored motion vector for predicting a motion vector of the coding treeblock and merging motion information thereof.

In addition, the apparatus of decoding an image may perform a decoding method such as motion vector prediction, advanced motion vector prediction, motion information merge, motion information merge skip, or the like, using the motion information stored in the memory, that is, the motion information of the reference picture.

Although the above-mentioned exemplary embodiments have described through flow charts represented by a series of steps or blocks, the present invention is not limited to a sequence of the steps described above. That is, some steps may be generated in a different sequence or simultaneously from or with other steps. In addition, it may be understood by those skilled in the art to which the present invention pertains that the steps shown in the flow charts are non-exclusive, such that other steps may be included or some steps may be deleted.

In addition, the above-mentioned exemplary embodiments include examples of various aspects. Although all possible combinations for showing various aspects are not described, it may be appreciated by those skilled in the art that other combinations may be made. Therefore, the present invention should be construed as including all other substitutions, alterations and modifications belong to the following claims.

The invention claimed is:

1. An image decoding apparatus comprising:
a reference picture buffer to store a reference picture; and
one or more processors to
calculate a scaling factor based on a picture order count of the reference picture,
clip the scaling factor in a first predetermined range,
scale a motion vector of the reference picture based on the clipped scaling factor,
clip the scaled motion vector of the reference picture in a second predetermined range, and
generate a prediction block based on the reference picture and the clipped scaled motion vector of the reference picture,
wherein the motion vector of the reference picture is determined as a motion vector of a collocated block in the reference picture,
wherein the motion vector of the collocated block is determined by performing the ordered steps of:
calculating a first position corresponding to a right-bottom position representing a position displaced from an upper-left position of a current block in a current picture by the current block's height and width,
determining a first block covering the first position in the reference picture,
determining whether the first block is coded in an intra prediction mode,
calculating, when the first block is coded in an intra prediction mode, a second position corresponding to a central position of the current block in the current picture, and
determining a second block covering the second position in the reference picture.

2. The image decoding apparatus of claim 1, wherein the second predetermined range is a fixed value range.

3. The image decoding apparatus of claim 1, wherein the motion vector of the reference picture is stored in a predetermined block unit, and
wherein the motion compensator is further configured to generate the prediction block using the motion vector of the reference picture stored in the predetermined block unit.

4. The image decoding apparatus of claim 2, wherein the motion compensator is further configured to clip X and Y components of the scaled motion vector in a same fixed value range.

5. The image decoding apparatus of claim 1, wherein the motion vector of the reference picture is a motion vector of a block decoded in an inter-prediction mode.

6. An image encoding apparatus comprising:
   a reference picture buffer to store a reference picture;
   one or more processors to generate a motion vector of a current block and a prediction block of the current block based on the reference picture; and
   an encoder configured to
      calculate a scaling factor based on a picture order count of the reference picture,
      clip the scaling factor in a first predetermined range,
      scale a motion vector of the reference picture based on the clipped scaling factor,
      clip the scaled motion vector of the reference picture in a second predetermined range, and
      encode the motion vector of the current block based on the clipped scaled motion vector of the reference picture,
   wherein the motion vector of the reference picture is determined as a motion vector of a collocated block in the reference picture,
   wherein the motion vector of the collocated block is determined by performing the ordered steps of:
      calculating a first position corresponding to a right-bottom position representing a position displaced from an upper-left position of a current block in a current picture by the current block's height and width,
      determining a first block covering the first position in the reference picture,
      determining whether the first block is coded in an intra prediction mode,
      calculating, when the first block is coded in an intra prediction mode, a second position corresponding to a central position of the current block in the current picture, and
      determining a second block covering the second position in the reference picture.

7. A non-transitory computer-readable storage medium storing a bitstream, wherein the bitstream is generated by an image encoding apparatus,
   wherein the image encoding apparatus comprises
   a reference picture buffer to store a reference picture;
   a motion estimator to generate a motion vector of a current block and a prediction block of the current block based on the reference picture; and
   one or more processors to
      calculate a scaling factor based on a picture order count of the reference picture,
      clip the scaling factor in a first predetermined range,
      scale a motion vector of the reference picture based on the clipped scaling factor,
      clip the scaled motion vector of the reference picture in a second predetermined range, and
      encode the motion vector of the current block based on the clipped scaled motion vector of the reference picture,
   wherein the motion vector of the reference picture is determined as a motion vector of a collocated block in the reference picture,
   wherein the motion vector of the collocated block is determined by performing the ordered steps of:
      calculating a first position corresponding to a right-bottom position representing a position displaced from an upper-left position of a current block in a current picture by the current block's height and width,
      determining a first block covering the first position in the reference picture,
      determining whether the first block is coded in an intra prediction mode,
      calculating, when the first block is coded in an intra prediction mode, a second position corresponding to a central position of the current block in the current picture, and
      determining a second block covering the second position in the reference picture.

* * * * *

(12) EX PARTE REEXAMINATION CERTIFICATE (12457th)
United States Patent
Lim et al.

(10) Number: US 10,244,252 C1
(45) Certificate Issued: Dec. 12, 2023

(54) METHOD AND APPARATUS FOR ENCODING/DECODING IMAGES USING A MOTION VECTOR

(75) Inventors: Sung Chang Lim, Daejeon-si (KR); Hui Yong Kim, Daejeon-si (KR); Se Yoon Jeong, Daejeon-si (KR); Suk Hee Cho, Daejeon-si (KR); Dong San Jun, Daejeon-si (KR); Jong Ho Kim, Daejeon-si (KR); Ha Hyun Lee, Seoul (KR); Jin Ho Lee, Daejeon-si (KR); Jin Soo Choi, Daejeon-si (KR); Jin Woong Kim, Daejeon-si (KR)

(73) Assignee: ELECTRONICS AND TELECOMMUNICATIONS RESEARCH INSTITUTE, Daejeon-si (KR)

Reexamination Request:
No. 90/019,030, Oct. 29, 2021

Reexamination Certificate for:
Patent No.: 10,244,252
Issued: Mar. 26, 2019
Appl. No.: 13/979,214
PCT Filed: Jan. 31, 2012
PCT No.: PCT/KR2012/000770
§ 371 (c)(1),
(2), (4) Date: Jun. 11, 2013
PCT Pub. No.: WO2012/105807
PCT Pub. Date: Aug. 9, 2012

(30) Foreign Application Priority Data

| Jan. 31, 2011 | (KR) | 10-2011-0009636 |
| Mar. 3, 2011 | (KR) | 10-2011-0019166 |
| May 27, 2011 | (KR) | 10-2011-0050853 |
| Jul. 1, 2011 | (KR) | 10-2011-0065707 |
| Jan. 31, 2012 | (KR) | 10-2012-0010096 |

(51) Int. Cl.
*H04N 19/513* (2014.01)
*H04N 19/61* (2014.01)
*H04N 19/426* (2014.01)
*H04N 19/44* (2014.01)

(52) U.S. Cl.
CPC ......... *H04N 19/513* (2014.11); *H04N 19/426* (2014.11); *H04N 19/44* (2014.11); *H04N 19/61* (2014.11)

(58) Field of Classification Search
None
See application file for complete search history.

(56) References Cited

To view the complete listing of prior art documents cited during the proceeding for Reexamination Control Number 90/019,030, please refer to the USPTO's Patent Electronic System.

*Primary Examiner* — Yuzhen Ge

(57) ABSTRACT

The present invention relates to a method and apparatus for encoding/decoding image using a motion vector. According to one embodiment of the present invention, an image-decoding method is provided. The image-decoding method comprises the following steps: clipping a motion vector of a reference picture with a predetermined dynamic range so as to generate a clipped motion vector; storing the clipped motion vector in a buffer; deriving a motion vector of a block to be decoded using the motion vector stored in the buffer; and performing inter-prediction decoding using the motion vector of the block to be decoded. According to the present invention, the size of a memory space required to store a motion vector may be reduced.

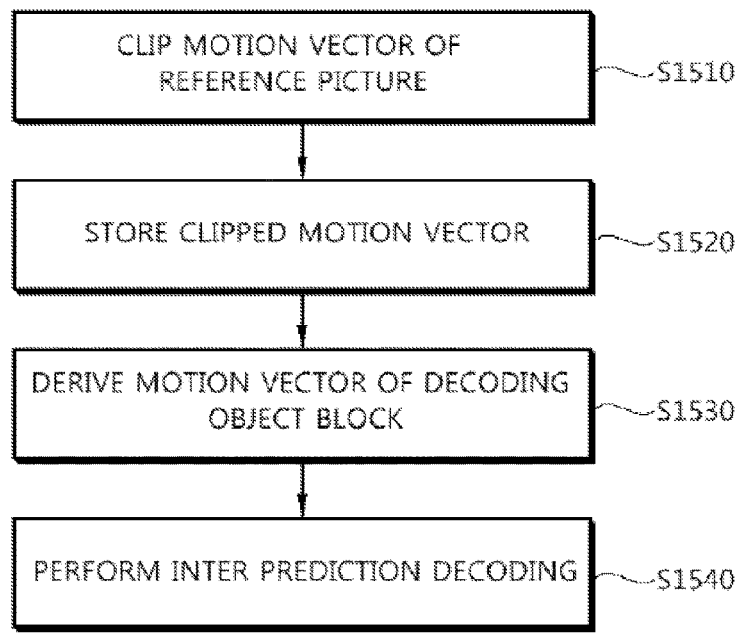

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6 and 7 are determined to be patentable as amended.

Claim 5, dependent on an amended claim, is determined to be patentable.

New claims 8-10 are added and determined to be patentable.

Claims 2-4 were not reexamined.

1. An image decoding apparatus comprising:
 a reference picture buffer to store a reference picture; and
 one or more processors *configured* to:
  *determine a motion vector of a reference picture as a motion vector of a collocated block in the reference picture,*
  calculate a scaling factor based on a picture order count of the reference picture,
  clip the scaling factor in a first predetermined range,
  scale [a] *the* motion vector of the reference picture based on the clipped scaling factor,
  clip the scaled motion vector of the reference picture in a second predetermined range, and
  generate a prediction block based on the reference picture and the clipped scaled motion vector of the reference picture,
 [wherein the motion vector of the reference picture is determined as a motion vector of a collocated block in the reference picture,]
 wherein the motion vector of the collocated block is determined by performing the ordered steps of:
  calculating a first position corresponding to a right-bottom position representing a position displaced from an upper-left position of a current block in a current picture by the current block's height and width,
  determining a first block covering the first position in the reference picture,
  determining whether the first block is coded in an intra prediction mode, calculating, when the first block is coded in an intra prediction mode, a second position corresponding to a central position of the current block in the current picture, and
  determining a second block covering the second position in the reference picture.

6. An image encoding apparatus comprising:
 a reference picture buffer to store a reference picture;
 one or more processors to generate a motion vector of a current block and a prediction block of the current block based on the reference picture; and
 an encoder configured to:
  *determine a motion vector of a reference picture as a motion vector of a collocated block in the reference picture,*
  calculate a scaling factor based on a picture order count of the reference picture,
  clip the scaling factor in a first predetermined range,
  scale [a] *the* motion vector of the reference picture based on the clipped scaling factor,
  clip the scaled motion vector of the reference picture in a second predetermined range, and
  code the motion vector of the current block based on the clipped scaled motion vector of the reference picture,
 [wherein the motion vector of the reference picture is determined as a motion vector of a collocated block in the reference picture,]
 wherein the motion vector of the collocated block is determined by performing the ordered steps of:
  calculating a first position corresponding to a right-bottom position representing a position displaced from an upper-left position of a current block in a current picture by the current block's height and width,
  determining a first block covering the first position in the reference picture,
  determining whether the first block is coded in an intra prediction mode,
  calculating, when the first block is coded in an intra prediction mode, a second position corresponding to a central position of the current block in the current picture, and
  determining a second block covering the second position in the reference picture.

7. A non-transitory computer-readable storage medium storing a bitstream,
 wherein the bitstream is generated by an image encoding apparatus,
 wherein the image encoding apparatus comprises*:*
 a reference picture buffer to store a reference picture;
 a motion estimator to generate a motion vector of a current block and a prediction block of the current block based on the reference picture; and
 one or more processors *configured* to*:*
  *determine a motion vector of a reference picture as a motion vector of a collocated block in the reference picture,*
  calculate a scaling factor based on a picture order count of the reference picture,
  clip the scaling factor in a first predetermined range,
  scale [a] *the* motion vector of the reference picture based on the clipped scaling factor,
  clip the scaled motion vector of the reference picture in a second predetermined range, and
  encode the motion vector of the current block based on the clipped scaled motion vector of the reference picture,
 [wherein the motion vector of the reference picture is determined as a motion vector of a collocated block in the reference picture,]
 wherein the motion vector of the collocated block is determined by performing the ordered steps of:
  calculating a first position corresponding to a right-bottom position representing a position displaced from an upper-left position of a current block in a current picture by the current block's height and width,
  determining a first block covering the first position in the reference picture,
  determining whether the first block is coded in an intra prediction mode, calculating, when the first block is coded in an intra prediction mode, a second position corresponding to a central position of the current block in the current picture, and determining a second block covering the second position in the reference picture.

8. The image decoding apparatus of claim 1, wherein the motion vector of the collocated block is stored in a predetermined block unit.

9. The image encoding apparatus of claim 6, wherein the motion vector of the collocated block is stored in a predetermined block unit.

10. The non-transitory computer-readable storage medium of claim 7, wherein the motion vector of the collocated block is stored in a predetermined block unit.

* * * * *